United States Patent
Koyama et al.

(10) Patent No.: US 8,115,160 B2
(45) Date of Patent: Feb. 14, 2012

(54) PROTECTION CIRCUIT AND PHOTOELECTRIC CONVERSION DEVICE

(75) Inventors: Jun Koyama, Kanagawa (JP); Yoshifumi Tanada, Kanagawa (JP); Hideaki Shishido, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 519 days.

(21) Appl. No.: 12/398,465

(22) Filed: Mar. 5, 2009

(65) Prior Publication Data
US 2009/0230292 A1  Sep. 17, 2009

(30) Foreign Application Priority Data
Mar. 14, 2008  (JP) .................... 2008-065273

(51) Int. Cl.
H03K 17/78 (2006.01)
H01J 40/14 (2006.01)
H02H 9/00 (2006.01)
(52) U.S. Cl. ................. 250/214 SW; 250/214 R; 361/56
(58) Field of Classification Search ............. 250/214 R, 250/214.1, 214 SW, 221; 361/1, 78, 86, 91.1, 361/91.4, 91.5, 56; 327/514, 515, 365
See application file for complete search history.

(56) References Cited

U.S. PATENT DOCUMENTS

| 5,444,310 | A | * | 8/1995 | Kataoka et al. | 307/125 |
| 5,608,614 | A | * | 3/1997 | Ohnishi et al. | 363/60 |
| 5,936,231 | A | | 8/1999 | Michiyama et al. | |
| 6,069,521 | A | * | 5/2000 | Taylor et al. | 327/540 |
| 6,799,015 | B1 | | 9/2004 | Tiwari | |
| 7,471,188 | B2 | | 12/2008 | Koyama et al. | |
| 2005/0122651 | A1 | | 6/2005 | Fischer et al. | |
| 2008/0094180 | A1 | | 4/2008 | Kato et al. | |
| 2008/0143531 | A1 | | 6/2008 | Tadokoro | |
| 2008/0156368 | A1 | | 7/2008 | Hirose et al. | |
| 2008/0174408 | A1 | | 7/2008 | Takahashi | |
| 2008/0237665 | A1 | | 10/2008 | Shishido | |
| 2008/0247208 | A1 | | 10/2008 | Fujita et al. | |
| 2009/0135534 | A1 | * | 5/2009 | Ishii | 361/56 |

FOREIGN PATENT DOCUMENTS

| JP | 09-329493 | 12/1997 |
| JP | 3444093 | 9/2003 |

* cited by examiner

*Primary Examiner* — Que T Le
*Assistant Examiner* — Pascal M Bui Pho
(74) *Attorney, Agent, or Firm* — Nixon Peabody LLP; Jeffrey L. Costellia

(57) ABSTRACT

A protection circuit and a photoelectric conversion device are provided, each of which includes a first wiring, a second wiring, a first switch, a second switch, a capacitor, and a comparing circuit configured to generate a signal corresponding to a potential of the first wiring and a potential of the second wiring, and supply the signal to the first switch and the second switch. The first wiring is electrically connected to a first terminal of the first switch, and the second wiring is electrically connected to a first terminal of the second switch. A second terminal of the first switch is electrically connected to a first electrode of the capacitor, and a second terminal of the second switch is electrically connected to a second electrode of the capacitor.

14 Claims, 17 Drawing Sheets

PROTECTION CIRCUIT AND PHOTOELECTRIC CONVERSION DEVICE

BACKGROUND OF THE INVENTION

1. Field of the Invention

This invention relates to an electrostatic protection circuit. In specific, this invention relates to an electrostatic protection circuit for protecting a photoelectric conversion circuit in a photoelectric conversion device including a thin film semiconductor. Moreover, this invention relates to a photoelectric conversion device including the electrostatic protection circuit and an electronic device including the photoelectric conversion device.

2. Description of the Related Art

A number of photoelectric conversion devices generally used for detecting an electromagnetic wave are known. For example, a photoelectric conversion device having sensitivity in ultra-violet rays to infrared rays are referred to as an optical sensor in general. Among them, an optical sensor having sensitivity in a visible light region with a wavelength of 400 to 700 nm is particularly referred to as a visible light sensor, and a large number of visible light sensors are used for devices which need illuminance adjustment, on/off control, or the like depending on human living environment.

In some display devices, ambient brightness of the display device is detected to adjust display luminance. This is because wasted electric power of the display device can be reduced by detecting ambient brightness with the use of an optical sensor and obtaining appropriate display luminance. For example, as display devices which include optical sensors for adjusting luminance, mobile phones and computers can be given.

In addition, as well as the ambient brightness of the display device, luminance of the backlight of a display device, in particular, a liquid crystal display device is also detected by an optical sensor to adjust the luminance of a display screen.

In an optical sensor, a photoelectric conversion element such as a photodiode is used for a light sensing part, and the output current of the photoelectric conversion element is amplified in an amplifier circuit. For example, a current mirror circuit is used as the amplifier circuit of the optical sensor (for example, see Reference 1: Japanese Patent No. 3444093)

SUMMARY OF THE INVENTION

In a photoelectric conversion device, a circuit for protecting a photodiode which is a load from an electrical stress such as static electricity (such circuit is also referred to as an electrostatic protection circuit or a protection circuit) is provided in a path of wirings which are electrically connected to the photo diode which is the load and a current mirror circuit and are supplied with high power supply potential and low power supply potential. Electrostatic protection circuits are used not only for photoelectric conversion devices but also for a variety of semiconductor devices by being electrically connected to loads. Note that semiconductor devices mean all devices that operate by utilizing semiconductor characteristics.

As a function of the electrostatic protection circuit, a function of limiting the amount of current which flows though a load can be given. In specific, the function of limiting the amount of current which flows through a load can be realized by providing a resistor element with several kiloohms electrically in parallel with the load, by providing a low pass filter for wirings to which high power supply potential and low power supply potential are input, or the like. Alternatively, in order to realize limitation of the amount of current which flows through the load, a structure with the bypass of the current which flows through the load is employed. In specific, the limitation of the amount of current which flows through the load can be realized by providing a diode element between the wirings to which high power supply potential and low power supply potential are input and bypassing current.

Note that in this specification, "a bypass" means an alternative pathway for current additionally provided and "to bypass" means to supply current through the alternative pathway additionally provided.

However, the structure in which a resistor element with several kiloohms is provided electrically in parallel with a load or the structure in which a low pass filter is provided for wirings to which high power supply potential and low power supply potential are input has a problem in that normal operation (also referred to as actual operation) of a photoelectric conversion device is disturbed. Moreover, a structure in which a diode element is provided between the wirings to which high power supply potential and low power supply potential are input to form a bypass is required to have a resistance value which is adequately smaller than that of the load and to supply a large amount of current in order to function as an electrical bypass. Accordingly, although a larger bonding area of the diode element is effective, there is a problem in that the electric capacitance of the diode element is increased due to the larger bonding area.

This invention is made in view of the foregoing problems and one object is to provide an electrostatic protection circuit which can adequately protect a circuit from electrical stress such as static electricity without disturbing normal operation.

In order to solve the above-described problems, in an embodiment of this invention, on/off of a first switch and a second switch is controlled in accordance with signals output from a comparing circuit electrically connected to a first wiring and a second wiring, and whether to store electric charge in a capacitor element is switched.

An embodiment of this invention is an electrostatic protection circuit including a first wiring to which a high power supply potential is input a second wiring to which a low power supply potential is input, a comparing circuit for outputting signals corresponding to the potential of the first wiring and the potential of the second wiring, a first switch whose first terminal is electrically connected to the first wiring and on/off is controlled by signals, a second switch whose first terminal is electrically connected to the second wiring and on/off is controlled by signals, and a capacitor element whose one electrode is electrically connected to a second terminal of the first switch and the other terminal is electrically connected to a second terminal of the second switch.

An embodiment of this invention is an electrostatic protection circuit including a first wiring to which a high power supply potential is input, a second wiring to which a low power supply potential is input, a load electrically connected to the first wiring and the second wiring, a comparing circuit for outputting signals corresponding to the potential of the first wiring and the potential of the second wiring, a first switch whose first terminal is electrically connected to the first wiring and on/off is controlled by the signal, a second switch whose first terminal is electrically connected to the second wiring and on/off is controlled by signals, and a capacitor element whose one electrode is electrically connected to a second terminal of the first switch and the other terminal is electrically connected to a second terminal of the second switch.

An embodiment of this invention is a photoelectric conversion device including a first wiring to which a high power supply potential is input, a second wiring to which a low power supply potential is input, a photoelectric conversion circuit having a photoelectric conversion element and an amplifier circuit portion and electrically connected to the first wiring and the second wiring, a comparing circuit for outputting signals corresponding to the potential of the first wiring and the potential of the second wiring, a first switch whose first terminal is electrically connected to the first wiring and on/off is controlled by the signal, a second switch whose first terminal is electrically connected to the second wiring and on/off is controlled by signals, and a capacitor element whose one electrode is electrically connected to a second terminal of the first switch and the other electrode is electrically connected to a second terminal of the second switch.

Moreover, in an embodiment of this invention, an input terminal of a photoelectric conversion circuit is electrically connected to the first wiring through a first resistor element, and an output terminal of the photoelectric conversion circuit is electrically connected to the second wiring through a second resistor element. In the case where the photoelectric conversion circuit includes only a photoelectric conversion element, the input terminal of the photoelectric conversion circuit corresponds to a terminal (an n-type terminal, a first terminal) on the higher potential side of the photoelectric conversion element, and the output terminal of the photoelectric conversion circuit corresponds to a terminal (a p-type terminal a second terminal) on the lower potential side of the photoelectric conversion element. Further, in the case where the photoelectric conversion circuit includes a photoelectric conversion element and an amplifier circuit, the input terminal of the photoelectric conversion circuit corresponds to a terminal (an n-type terminal) of the higher potential side of the photoelectric conversion element, and the output terminal of the photoelectric conversion circuit corresponds to a terminal included in the amplifier circuit and connected to the second wiring.

A load can be protected from electrical stress without disturbing actual operation of the load provided in a photoelectric conversion device or the like.

DETAILED DESCRIPTION OF THE INVENTION

Figure 1:
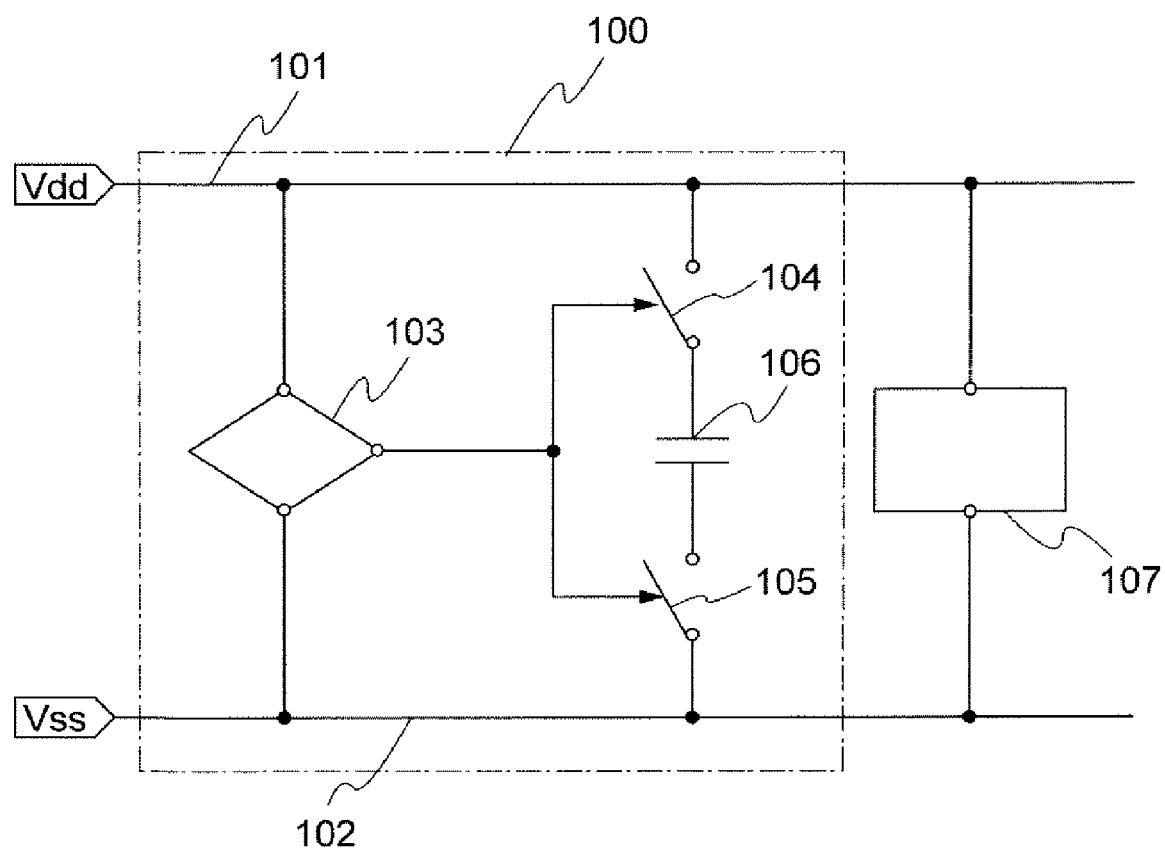
FIG. 1 is a diagram for illustrating Embodiment 1.

Hereinafter, embodiments of this invention will be described with reference to the drawings. However, this invention may be implemented in various different forms, and it is easily understood by those skilled in the art that various changes are possible without departing from the scope and spirit of this invention. Therefore, this invention should not be construed as being limited to the description of the embodiments. Note that in all drawings for explaining embodiments, the same portions or portions having similar functions are denoted by the same reference numerals and explanations thereof are not repeated.

Embodiment 1

The structure of an electrostatic protection circuit will be described. Note that an electrostatic protect tion circuit described in this embodiment is a circuit for protecting a load which operates by utilizing semiconductor characteristics from electrical stress without disturbing actual operation of the load.

First, a block diagram and a circuit diagram of an electrostatic protection circuit will be described. An electrostatic protection circuit 100 shown in FIG. 1 includes a comparing circuit 103 electrically connected to a first wiring 101 and a second wiring 102, a first switch 104, a second switch 105, and a capacitor element 106 and is electrically connected to a load 107 through the first wiring 101 and the second wiring 102. When a potential $V_{ESD}$ due to electrical stress such as static electricity (hereinafter, such potential is also referred to as electrostatic potential), which causes ESD (electrostatic discharge) of elements included in the load, is applied to the first wiring 101 and the second wiring 102 besides a high power supply potential Vdd input to the first wiring 101 and a low power supply potential Vss applied to the second wiring 102, the electrostatic protection circuit 100 prevents electrostatic discharge of the load 107 by suppressing the voltage applied to the load 107. In addition, the comparing circuit 103 compares potentials input to the first wiring 101 and the second wiring 102 to determine whether each of the potentials is a high power supply potential Vdd, a low power supply potential Vss, or an electrostatic potential $V_{ESD}$, and controls on/off of the first switch 104 and the second switch 105 in accordance with signals based on the comparison result. On/off of the first switch 104 and the second switch 105 is controlled by signals output from the comparing circuit 103. The capacitor element 106 stores electric charge which flows to the capacitor element 106 due to the electrostatic potential $V_{ESD}$ applied to the first wiring 101 and the second wiring 102. The load 107 operates normally by application of the high power supply potential Vdd input to the first wiring 101 and the low power supply potential Vss input to the second wiring 102, which are electrically connected to the load 107.

Note that terms such as first, second, third to Nth (N is a natural number) seen in this specification are used in order to avoid confusion between components and do not set a limitation on number.

Note that the phrase "A and B are connected" in this specification also means electrical connection between A and B. Note that the case where A and B are electrically connected also includes the case where an object having any electrical action is provided between A and B.

Note that in this specification, any switch can be used as long as it can control conduction and non-conduction between one terminal and the other terminal without any particular limitation. As a switch, an electrical switch, a mechanical switch, or the like can be given. A thin film transistor may be used, for example.

Note that a resistor element may be provided between the load 107 and each of the first wiring 101 and the second wiring 102. Here, note that the resistance value of the resistor element does not adversely affect the actual operation of the load. By providing a resistor element between the load 107 and each of the first wiring 101 and the second wiring 102, delay of signals due to wiring capacitance in the electrostatic protection circuit 100 or voltage application on the load by electrostatic potential $V_{ESD}$, which is caused by delay of on/off switching of the first switch 104 and the second switch 105, can be suppressed.

When a potential higher than the high power supply potential Vdd, that is, the electrostatic potential $V_{ESD}$ is applied to the first wiring 101 or the second wiring 102, the comparing circuit 103 outputs signals which turn on both of the first switch 104 and the second switch 105. In addition, when the high power supply potential Vdd and the low power supply potential Vss with which the load can actually operate are input to the first wiring 101 and the second wiring 102, the comparing circuit 103 outputs signals which turn off both of the first switch 104 and the second switch 105.

Figure 2:
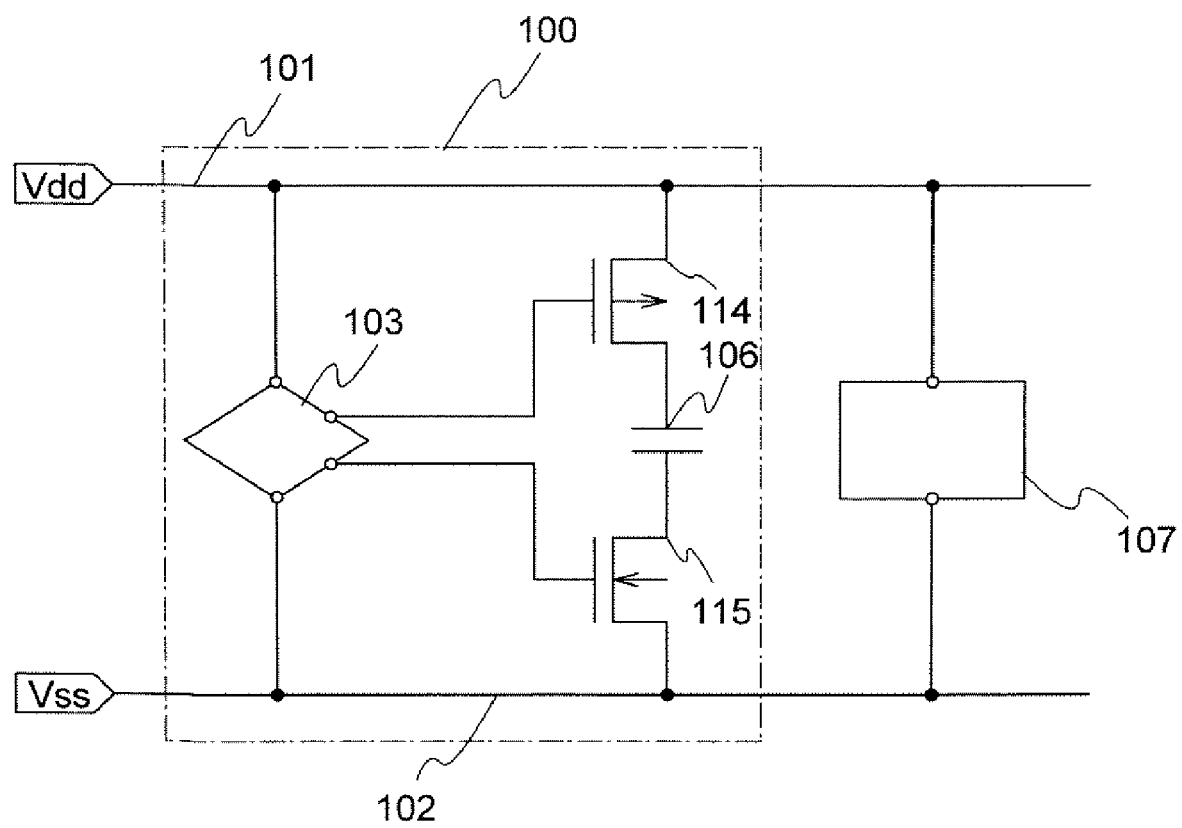
FIG. 2 is a diagram for illustrating Embodiment 1.

Note that a first terminal (one terminal) of the first switch 104 is electrically connected to the first wiring 101 and on/off of the first switch 104 is controlled by the comparing circuit 103. In addition, a first terminal of the second switch 105 is electrically connected to the second wiring 102 and on/off of the second switch 105 is controlled by the comparing circuit 103. In addition, one electrode of the capacitor element 106 is electrically connected to a second terminal (the other terminal) of the first switch 104 and the other electrode of the capacitor element 106 is electrically connected to a second terminal of the second switch 105. In the structure of this embodiment, the first switch 104 and the second switch 105 are turned on or off at the same time in accordance with signals from the comparing circuit 103. For example, as shown in FIG. 2, it is preferable that a p-channel transistor 114 be used as the first switch 104 and an n-channel transistor 115 be used as the second switch 105. Since the p-channel transistor 114 and the n-channel transistor 115 are used as the first switch 104 and the second switch 105, respectively, a source and a drain of each transistor are determined. Accordingly, on/off of the p-channel transistor 114 and the n-channel transistor 115 can be easily controlled. In order to easily control on/off of the transistor, absolute value of voltage between a gate and the source of each transistor can be made large, so that the transistor can be easily operated as a switch.

Note that a transistor like the p-channel transistor 114 or the n-channel transistor 115 is an element including at least three terminals of a gate, a drain, and a source, and includes a channel region between a drain region and a source region. Current can flow through the drain region, the channel region, and the source region. Here, since a source and a drain are switched with each other depending on the structure, operating condition, or the like of the transistor, it is difficult to determine which is the source or the drain in some cases. Accordingly, in this embodiment, one of regions which function as a source and a drain is referred to as a first terminal and the other region is referred to as a second terminal. In addition, a terminal which functions as a gate is referred to as a gate terminal.

Note that transistors with various structures can be used as transistors like the p-channel transistor 114 and the n-channel transistor 115. For example, a thin film transistor (TFT) having a non-single-crystal semiconductor film typified by amorphous silicon, polycrystalline silicon, microcrystalline (also referred to as microcrystal or semi-amorphous) silicon, or the like may be used. In the case where a TFT is used, since the TFT can be manufactured through a process at comparatively low temperature, a large manufacturing apparatus can be used, so that the TFT can be manufactured over a large substrate. Accordingly, a large number of electrostatic protection circuits can be obtained through one manufacturing process and the electrostatic protection circuits can be manufactured at low cost. Further, since the TFT is manufactured through the process at comparatively low temperature, a substrate with low heat resistance can be used. Therefore, a transistor can be formed over a substrate having a light-transmitting property (e.g., a glass substrate having an insulating surface) and can be used for a device which utilizes light transmission.

It is preferable that the capacitance of the capacitor element 106 be adequately higher than capacitance between the first terminal and the second terminal of each of the first switch 104 and the second switch 105 while the first switch 104 and the second switch 105 are off, and be capacitance for storing electric charge which flows to the capacitor element due to the electrostatic potential $V_{ESD}$ applied to the first wiring.

Figure 3A:
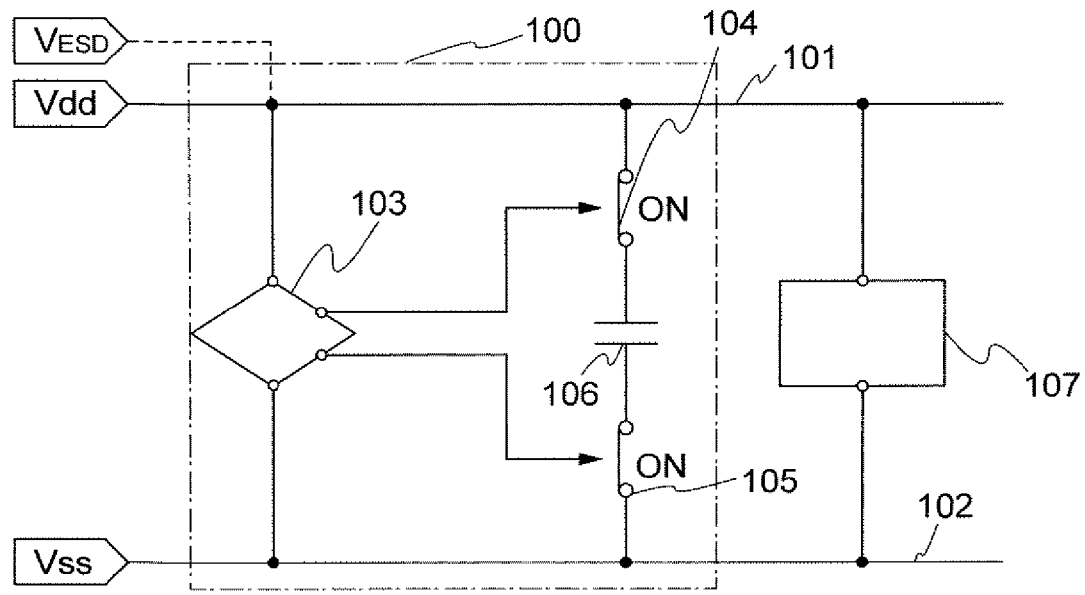
FIGS. 3A and 3B are diagrams for illustrating Embodiment 1.
Figure 3B:
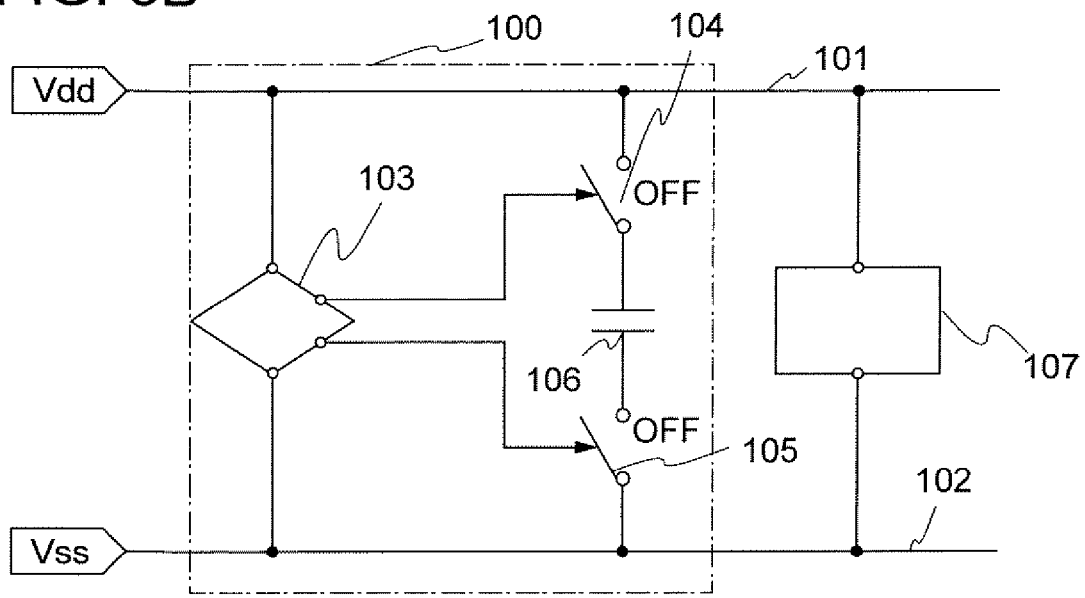

Next, the specific operation of the electrostatic protection circuit will be described with reference to FIGS. 3A and 3B. FIG. 3A shows operation when the electrostatic potential $V_{ESD}$ is generated in the first wiring 101. FIG. 3B shows operation when the high power supply potential Vdd and the low power supply potential Vss which make the load 107 actually operate are input to the first wiring 101 and the second wiring 102.

In a state shown in FIG. 3A, the electrostatic potential $V_{ESD}$ is being input to the first wiring 101. Accordingly, as described above, the comparing circuit 103 outputs signals for turning on both of the first switch 104 and the second switch 105.

Moreover, in a state shown in FIG. 3B, the high power supply potential Vdd and the low power supply potential Vss are input to the first wiring 101 and the second wiring 102, respectively; voltage with which the load 107 can actually operate is input to the first wiring 101 and the second wiring 102. Accordingly, as described above, the comparing circuit 103 outputs signals for turning off both of the first switch 104 and the second switch 105.

Figure 4A:
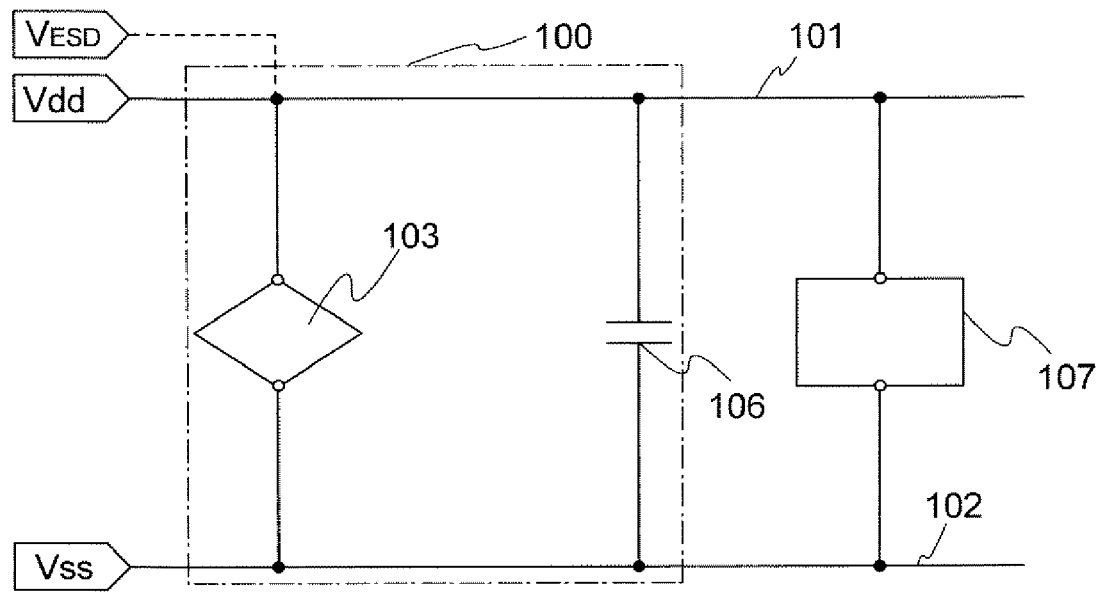
FIGS. 4A and 4B are diagrams for illustrating Embodiment 1.

The electrostatic protection circuit 100 enters into a state shown in FIG. 4A due to the operation of the first switch 104 and the second switch 105 shown in FIG. 3A. That is, the electrostatic protection circuit 100 includes the capacitor element 106 provided in parallel with the load 107 and electrically connected to the first wiring 101 and the second wiring 102. The capacitor element 106 can store electric charge which flows to the capacitor element 106 due to the electrostatic potential $V_{ESD}$ applied to the first wiring and can protect the load 107 from electrical stress.

Figure 4B:
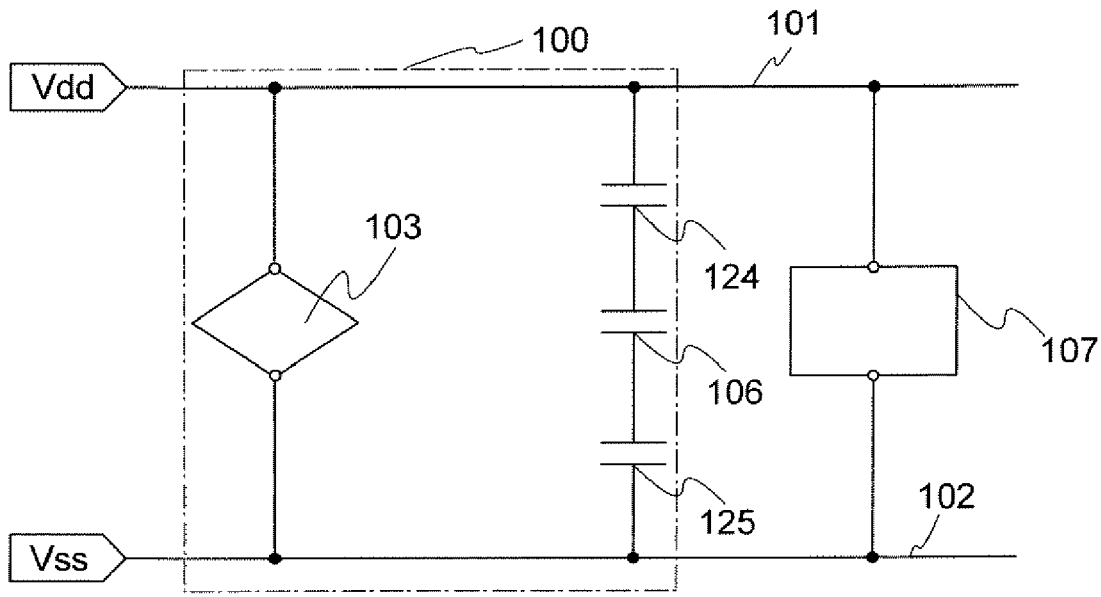

In addition, the electrostatic protection circuit 100 enters into a state shown in FIG. 4B due to the operation of the first switch 104 and the second switch 105 shown in FIG. 3B. That is, the electrostatic protection circuit 100 includes a capacitor element 124, the capacitor element 106, and a capacitor element 125 which are provided in parallel with the load 107 and electrically connected to the first wiring 101 and the second wiring 102, in series. Note that the capacitor element 124 described in FIG. 4B is a capacitor element for explanation, which represents capacitance generated between the first terminal and the second terminal of the first switch 104 in an off state. In addition, the capacitor element 125 described in FIG. 4B is shown as a capacitor element for explanation, which represents capacitance generated between the first terminal and the second terminal of the second switch in an off state.

Here, when the capacitances of the capacitor element 124, the capacitor element 106, and the capacitor element 125 which are shown in FIG. 4B are denoted by $C_1$, $C_2$, and $C_3$, respectively, the sum C of the capacitances of the capacitor element 124, the capacitor element 106, and the capacitor element 125 electrically connected in series is $1/C=1/C_1+1/C_2+1C_3$. Therefore, even if the capacitance $C_2$ of the capacitor element 106 is high enough to store electric charge which flows to the capacitor element 106 due to the electrostatic potential $V_{ESD}$ applied to the first wiring, the load 107 can be protected from electrical stress without disturbing the actual operation of the load by switching the state in FIG. 4A and the state in FIG. 4B with each other.

Figure 5:
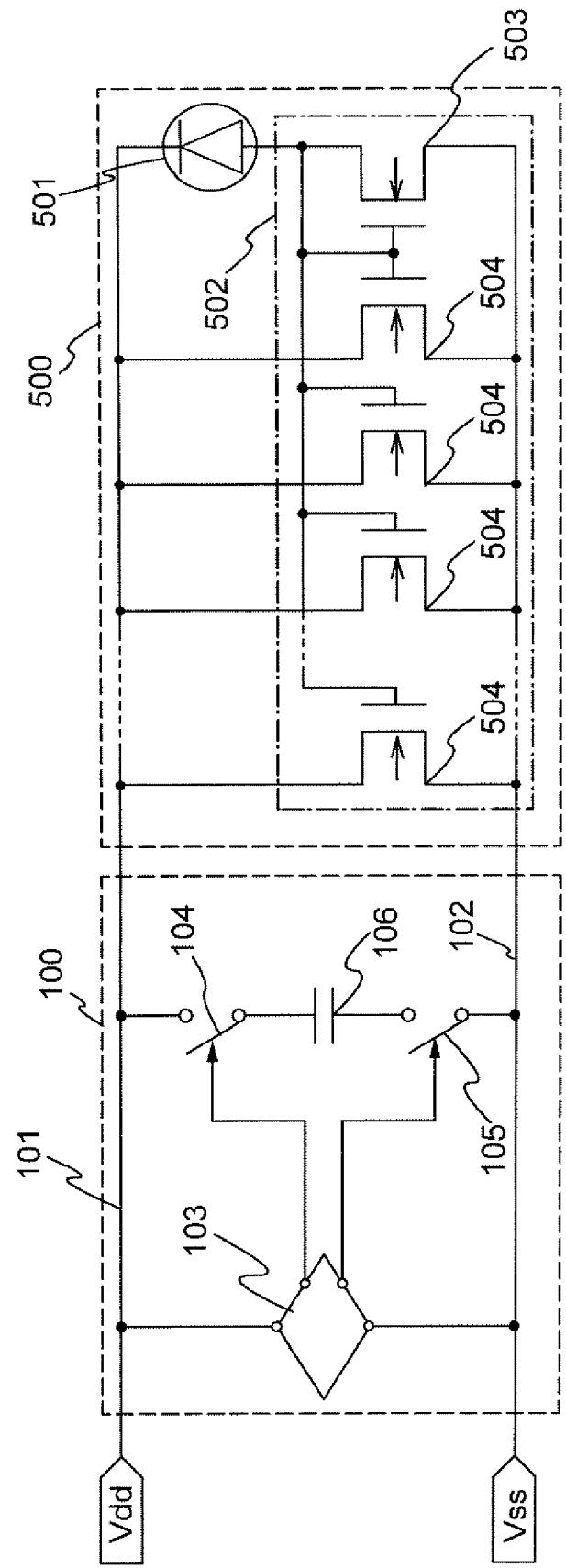
FIG. 5 is a diagram for illustrating Embodiment 1.

Further, FIG. 5 illustrates one example of the above-described load. A photoelectric conversion circuit 500 is shown as the load in FIG. 5. That is, FIG. 5 illustrates the structure of a photoelectric conversion device including the photoelectric conversion circuit 500 electrically connected to the electrostatic protection circuit 100. The photoelectric conversion circuit 500 shown in FIG. 5 includes a photodiode 501 which is a photoelectric conversion element and an amplifier circuit 502. The amplifier circuit 502 includes a current mirror circuit and amplifies current which flows through a transistor 503 in accordance with the number of a plurality of transistors 504 to output the amplified current.

As shown in FIG. 5, voltage required for actual operation or high voltage due to the electrostatic potential $V_{ESD}$ caused by electrical stress is applied to the photoelectric conversion circuit 500 through the first wiring 101 and the second wiring 102. In the photoelectric conversion circuit 500 shown in FIG. 5, if high voltage is applied to the transistor 504 in the amplifier circuit 502 whose withstand voltage is comparatively lower than that of the photodiode 501, the breakdown of the transistor is concerned. In specific, since a terminal on a drain side of the transistor 504 in the amplifier circuit 502 is directly connected to the first wiring 101 to which the high power supply potential Vdd is input, the breakdown of the transistor due to high voltage is concerned.

Like the photoelectric conversion circuit shown in FIG. 5, this embodiment is especially effective for a structure in which an element such as a transistor with low withstand voltage is included and voltage required for actual operation is applied. Moreover, this embodiment is especially effective in the case where the value of current output from the load is not desired to be changed by the electrostatic protection circuit or in the case where delay of signals to be input is not desired to be caused by the capacitance of the electrostatic protection circuit. By providing a capacitor element capable of storing electric charge which flows to the capacitor element due to the electrostatic potential $V_{ESD}$ applied to the first wiring in the electrostatic protection circuit, the load can be protected from electrical stress, and influence on the actual operation of the electrostatic protection circuit can be small by turning the first switch and the second switch on when the electrostatic protection circuit actually operates.

Note that in this embodiment, the contents described in each drawing can be freely combined or replaced with the contents described in any of different embodiments as appropriate.

Embodiment 2

In this embodiment, the structure of the comparing circuit in the electrostatic protection circuit described in the above embodiment will be specifically illustrated. In this embodiment, the structure of the photoelectric conversion device which includes the photoelectric conversion circuit electrically connected to the electrostatic protection circuit as a load, which is shown in FIG. 5 of Embodiment 1, will be described.

Figure 6:
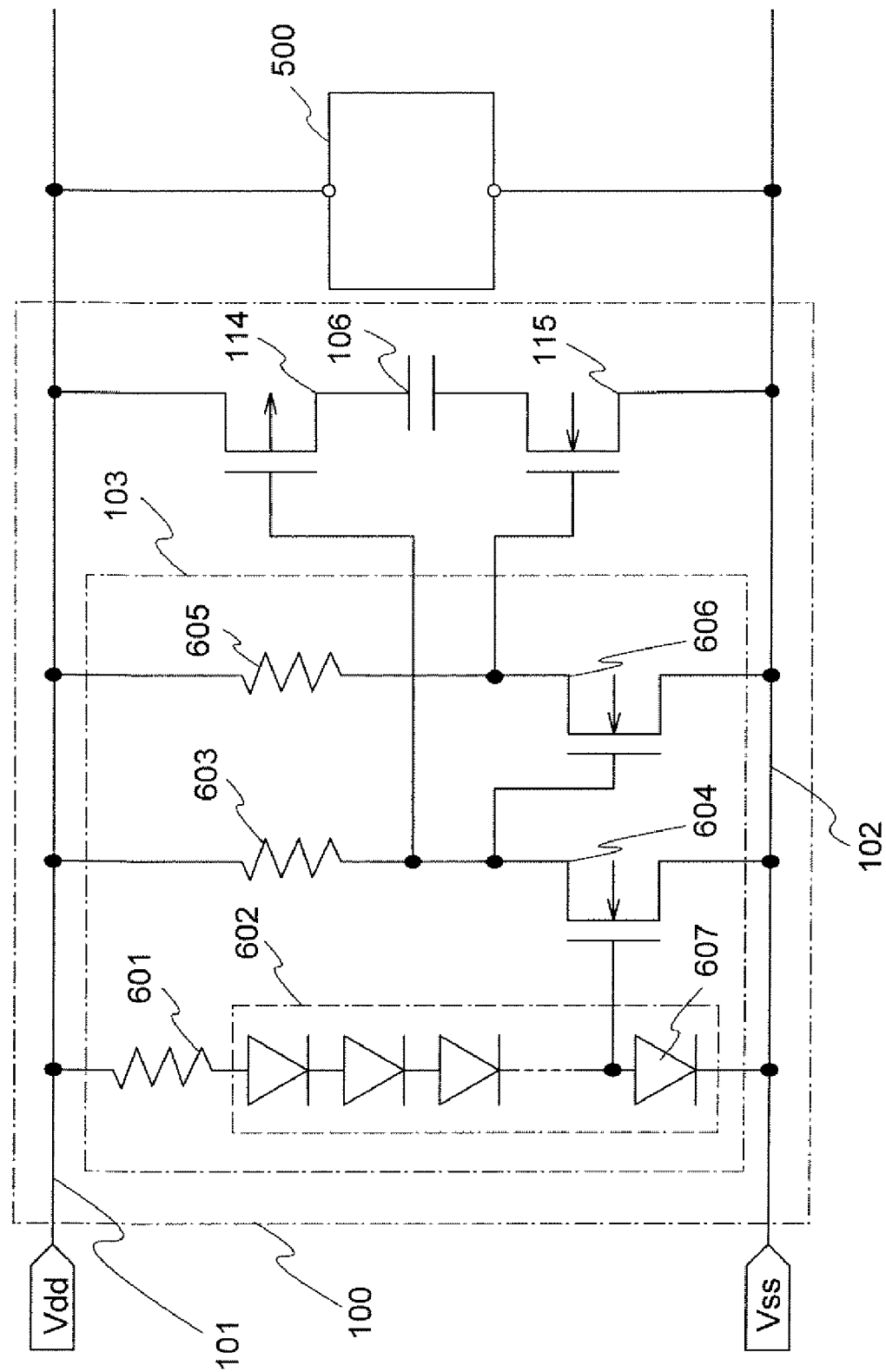
FIG. 6 is a diagram for illustrating Embodiment 2.

A photoelectric conversion device shown in FIG. 6 includes the electrostatic protection circuit 100 and the photoelectric conversion circuit 500. The electrostatic protection circuit 100 includes the comparing circuit 103 electrically connected to the first wiring 101 and the second wiring 102, the first switch 104, the second switch 105, and the capacitor element 106. When the potential $V_{ESD}$ which causes electrostatic discharge of elements included in the photoelectric conversion circuit 500 is applied to the first wiring 101 and the second wiring 102 besides the high power supply potential Vdd input to the first wiring 101 and the low power supply potential Vss applied to the second wiring 102, the electrostatic protection circuit 100 prevents electrostatic discharge of the photoelectric conversion circuit 500 by suppressing voltage applied to the photoelectric conversion circuit 500. In addition, the comparing circuit 103 compares potentials input to the first wiring 101 and the second wiring 102 to determine whether each of the potentials is the high power supply potential Vdd, the low power supply potential Vss, or the electrostatic potential $V_{ESD}$, and controls on/off of the first switch 104 and the second switch 105 in accordance with signals based on the comparison result. On/off of the first switch 104 and the second switch 105 is controlled by signals output from the comparing circuit 103. The capacitor element 106 stores electric charge which flows to the capacitor element 106 due to the electrostatic potential $V_{ESD}$ applied to the first wiring 101 or the second wiring 102. The photoelectric conversion circuit 500 includes a photodiode and an amplifier circuit, amplifies current which flows in accordance with the amount of light with which the photo diode is irradiated, and outputs the amplified current. Note that in this embodiment, the first switch 104 and the second switch 10 are described as a p-channel transistor and an n-channel transistor below.

Next, the structure of the comparing circuit 103 will be described. The comparing circuit 103 includes a first resistor element 601, a plurality of diode elements 602, a second resistor element 603, a first n-channel transistor 604, a third resistor element 605, and a second n-channel transistor 606.

The first resistor element 601, the second resistor element 603, and the third resistor element 605 can be realized by using a variety of elements; in specific, by using an element whose voltage drops when current flows. As a resistor element, a silicon layer, an oxide semiconductor such as indium tin oxide (ITO) or indium zinc oxide (IZO), a conductor with long wiring length by making the wiring meandrous, or the like can be used. In addition, one terminal of the first resistor element 601 is electrically connected to the first wiring 101, and the other terminal (also referred to as a second terminal) of the first resistor element 601 is connected to an anode of a diode element included in the plurality of diode elements 602. Moreover, one terminal of the second resistor element 603 is electrically connected to the first wiring 101, and the other terminal of the second resistor element 603 is electrically connected to a first terminal of the first n-channel transistor 604 and a gate terminal of the p-channel transistor 114. Further, one terminal of the third resistor element 605 is electrically connected to the first wiring 101, and the other terminal of the third resistor element 605 is electrically connected to a first terminal of the second n-channel transistor 606 and a gate terminal of the n-channel transistor 115.

The plurality of diode elements 602 has N (N is a natural number: 2 or more) diode elements electrically connected in series. That is, as described above, an anode of a diode element in a first stage is electrically connected to the second terminal of the first resistor element 601, and a cathode of the diode element in the first stage is electrically connected to an anode of a diode element in a second stage. Further, a cathode of the diode element in the second stage is electrically connected to an anode of a diode element in a third stage. Furthermore, an anode of a diode element 607 in an Nth stage and a cathode of the diode element in the Nth stage are electrically connected to a cathode of a diode element in an (N−1)th stage and the second wiring 102, respectively. Furthermore, the anode of the diode element 607 in the Nth stage is electrically connected to a gate terminal of the first n-channel transistor 604.

Note that in this embodiment, a structure in which the anode of the diode element 607 in the Nth stage is electrically connected to the gate terminal of the first n-channel transistor 604 is described for explanation; however, an anode of the diode element in the (N−1)th stage may be electrically connected to the gate terminal of the first n-channel transistor 604.

Note that a diode element may be formed using an element whose terminal to be a drain of a transistor is electrically connected to a gate terminal of the transistor, a so-called diode connected element. Alternatively, the diode element may be formed using a diode with a p-n junction or a p-i-n junction, which includes regions having impurity elements which impart p-type and n-type conductivities to a semiconductor film.

Note that a diode element may be provided inversely with the plurality of diode elements 602, that is, an anode and a cathode of the diode element may be electrically connected to the second wiring 102 and the first wiring 101, respectively, between the first wiring 101 to which a high power supply potential is input and the second wiring 102 to which a low power supply potential is input. When the electrostatic potential $V_{ESD}$ is generated on the second wiring 102 side, the diode element which is provided inversely with the plurality of diode elements 602 can prevent breakdown of the photoelectric conversion circuit 500 which is a load by supplying current to the first wiring 101 side for bypassing. Note that the diode element is preferably larger than each of the plurality of diode elements 602 in consideration of the amount of current which flows when the electrostatic potential $V_{ESD}$ is generated.

The first terminal of the first n-channel transistor 604 is electrically connected to a gate terminal of the second n-channel transistor 606. In addition, a second terminal of the first n-channel transistor 604 is electrically connected to the second wiring 102.

The first terminal of the second n-channel transistor 606 is electrically connected to the gate terminal of the n-channel transistor 115. In addition, a second terminal of the second n-channel transistor 606 is electrically connected to the second wiring 102.

Figure 7:
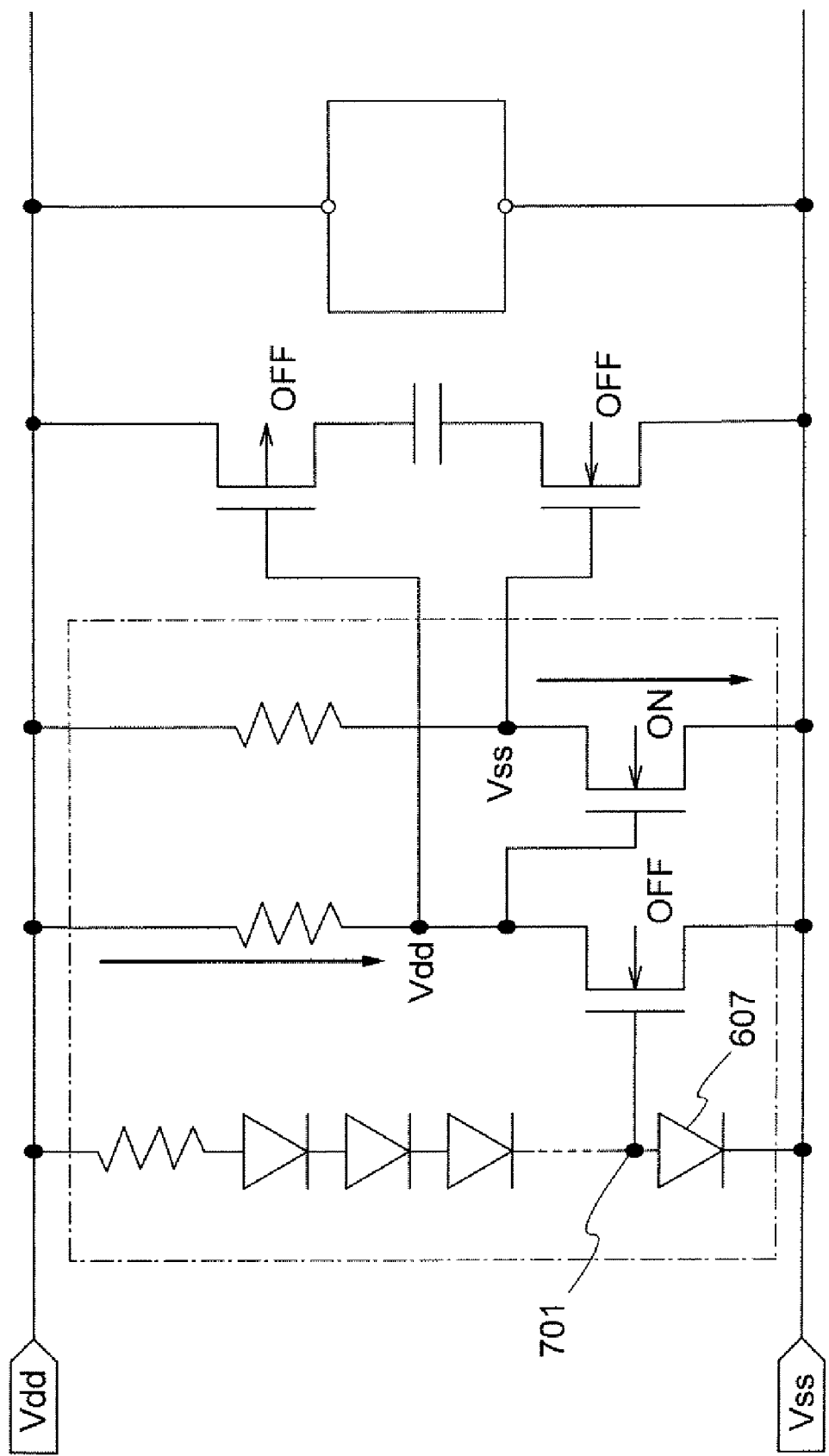
FIG. 7 is a diagram for illustrating Embodiment 2.

Next, the operation of the photoelectric conversion device shown in FIG. 6 will be described with reference to FIG. 7 and FIG. 8. First, the operation of the comparing circuit 103 when the high power supply potential Vdd and the low power supply potential Vss are input to the first wiring 101 and the second wiring 102, respectively, and the photoelectric conversion circuit which is a load can actually operate will be described with reference to FIG. 7.

Voltage between the high power supply potential Vdd which is input to the first wiring 101 and the low power supply potential Vss is divided by the first resistor element 601 and the plurality of diode elements 602. The number of stages of the plurality of diode elements 602 is determined in advance so that, as a result of the division, a potential difference between the potential of the anode of the diode element in the Ath stage and the potential of the second wiring 102, that is, a potential Vgs between a gate and a source of the first n-channel transistor is lower than the threshold voltage Vth of the first n-channel transistor. Then, since the first n-channel transistor is off (has high resistance), a potential which is divided by a node between the second resistor element 603 and the first n-channel transistor 604 is approximately equal to the high power supply potential Vdd. In addition, since the second n-channel transistor 606 is on (has low resistance), a potential which is divided by a node between the third resistor element 605 and the second n-channel transistor 606 is approximately equal to the low power supply potential Vss. Accordingly, by applying the high power supply potential Vdd and the low power supply potential Vss to the gate terminal of the p-channel transistor 114 and the gate terminal of the n-channel transistor 115, respectively, the comparing circuit 103 can turn off both of the p-channel transistor 114 and the n-channel transistor 115. In this manner, the state of FIG. 4B which is described in Embodiment 1 is realized.

Next, the operation of the comparing circuit 103 when the electrostatic potential $V_{ESD}$ and the low power supply potential Vss are input to the first wiring 101 and the second wiring 102, respectively, and the electrostatic protection circuit 100 operates so as to prevent application of high voltage to the photoelectric conversion circuit which is a load will be described with reference to FIG. 8.

Voltage between the electrostatic potential $V_{ESD}$ which is input to the first wiring 101 and the low power supply potential Vss is divided by the first resistor element 601 and the plurality of diode elements 602. Since the voltage between the electrostatic potential $V_{ESD}$ and the low power supply potential Vss is adequately higher than voltage between the high power supply potential Vdd and the low power supply potential Vss, the voltage Vgs between the gate and the source of the first n-channel transistor is higher than the threshold voltage Vth of the first n-channel transistor as a result of the division of the voltage, which is different from the case described in FIG. 7. Accordingly, since the first n-channel transistor is on (has low resistance), a potential which is divided by a node between the second resistor element 603 and the first n-channel transistor 604 is approximately equal to the low power supply potential Vss. In addition, since the second n-channel transistor 606 is off (has high resistance), a potential which is divided by a node between the third resistor element 605 and the second n-channel transistor 606 is approximately equal to the high power supply potential Vdd. Accordingly, by applying the low power supply potential Vss and the high power supply potential Vdd to the gate terminal of the p-channel transistor 114 and the gate terminal of the n-channel transistor 115, respectively, the comparing circuit 103 can turn on both of the p-channel transistor 114 and the n-channel transistor 115.

Figure 8:
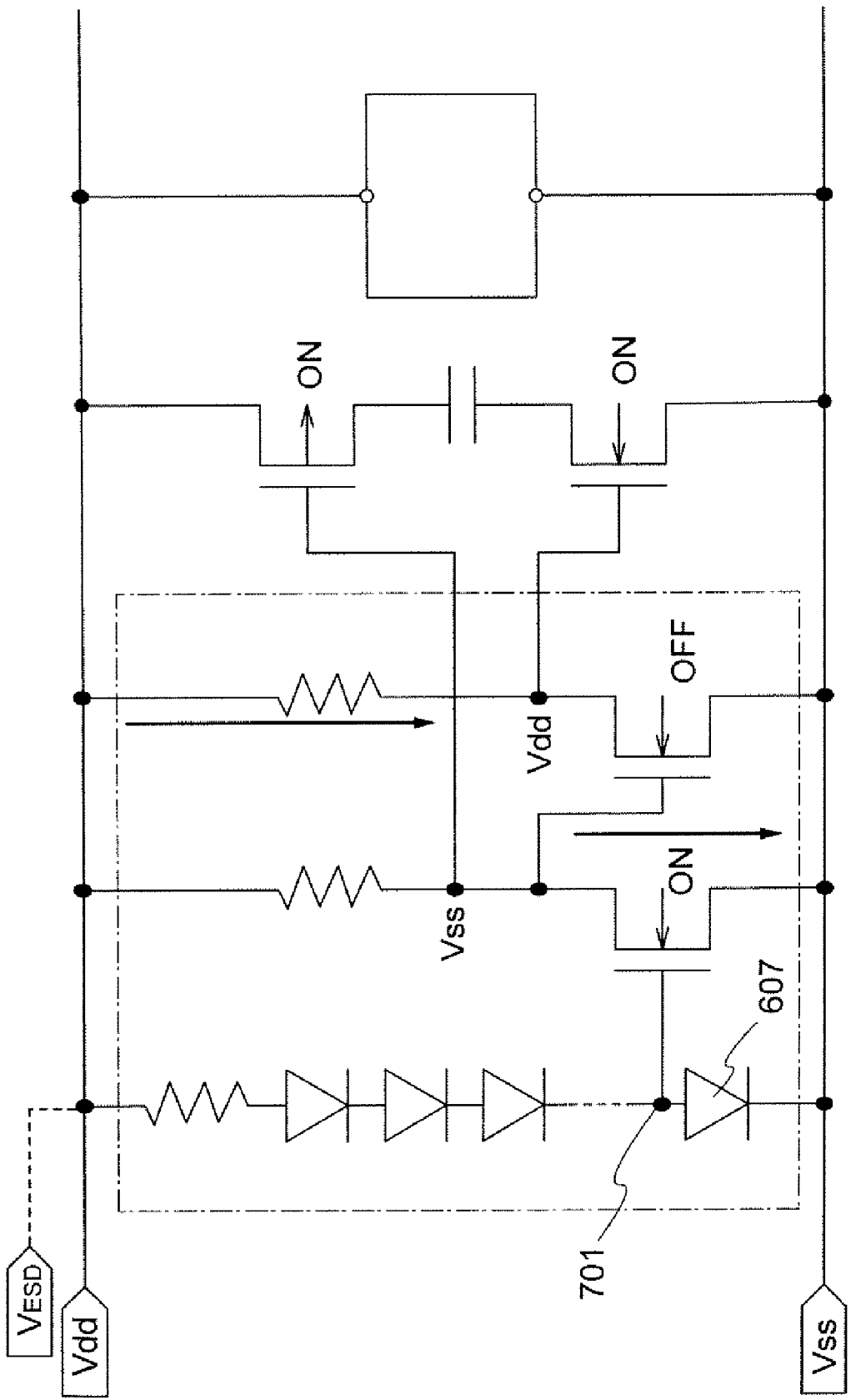
FIG. 8 is a diagram for illustrating Embodiment 2.
Figure 9:
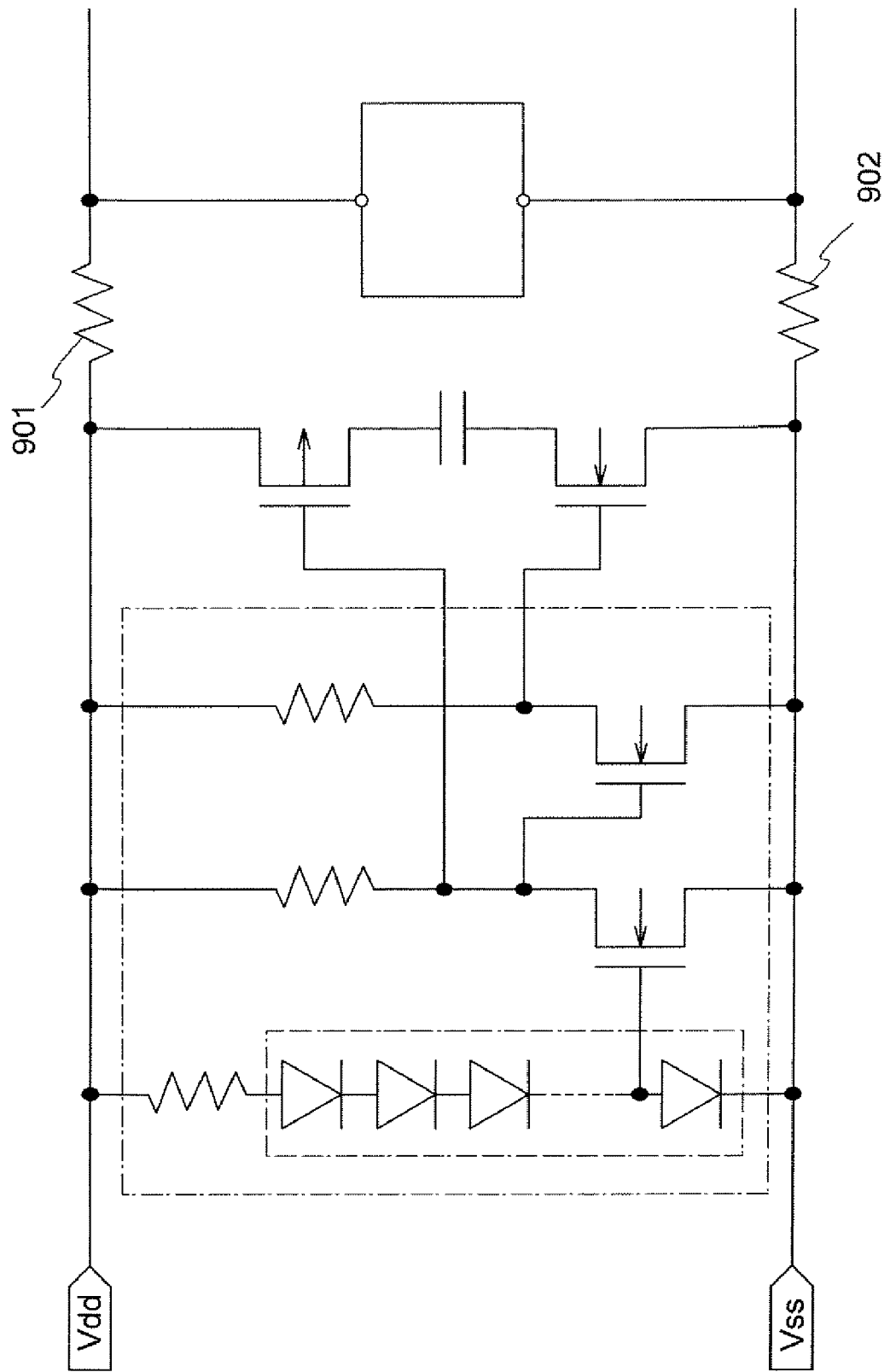
FIG. 9 is a diagram for illustrating Embodiment 2.

Note that as shown in FIG. 8, both of the p-channel transistor 114 and the n-channel transistor 115 are turned on after the on/off switching of a plurality of transistors in the comparing circuit 103. Accordingly, delay of signals due to parasitic capacitance in each wiring, gate capacitance in the transistor, or the like is preferably considered. Thus, in order to suppress application of high voltage to the photoelectric conversion circuit 500 which is the load due to the electrostatic potential $V_{ESD}$, a resistor element 901 and a resistor element 902 may be provided between the first wiring 101 and the second wiring 102, and the photoelectric conversion circuit, as shown in FIG. 9. Note that the resistor element 901 and the resistor element 902 preferably have resistance values which do not adversely affect the actual operation of the photoelectric conversion circuit.

Note that in this embodiment, the contents described in each drawing can be freely combined or replaced with the contents described in any of different embodiments as appropriate.

Embodiment 3

In this embodiment, one example of manufacturing the photoelectric conversion device described in Embodiment 2 will be described. In specific, an example in which a thin film transistor (TFT) is formed using a semiconductor film formed over an insulating substrate and then the photoelectric conversion device is manufactured will be described in this embodiment.

Figure 10:
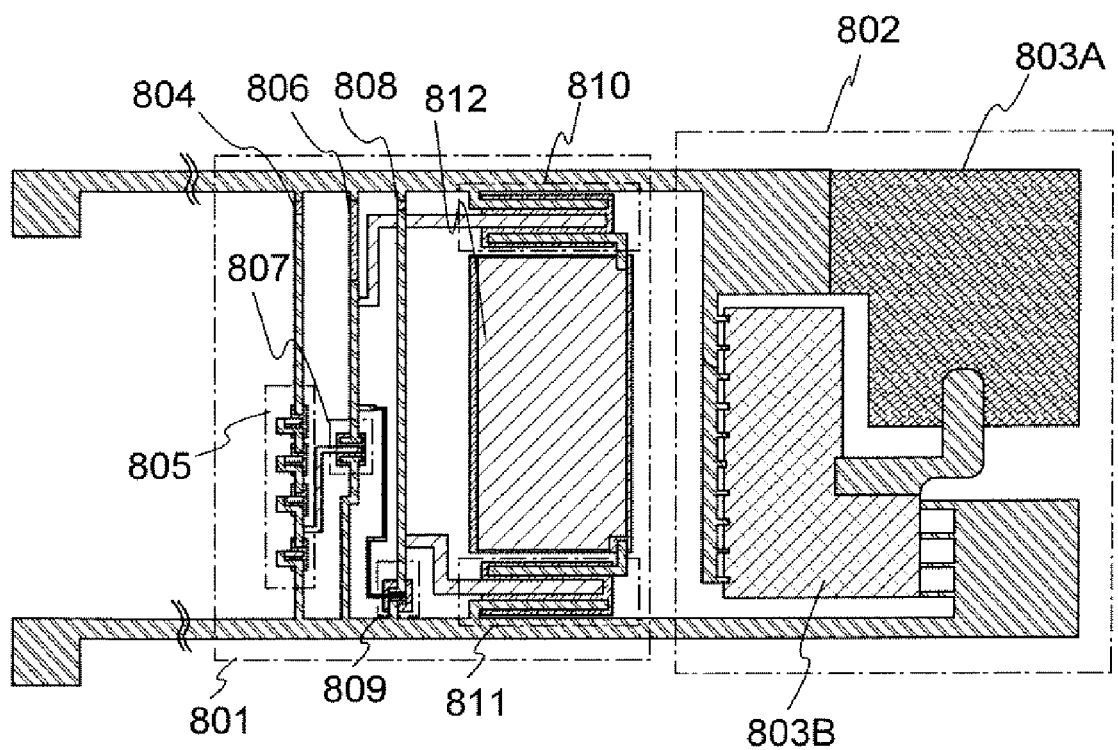
FIG. 10 is a diagram for illustrating Embodiment 3.

First, one example of a top view of the photoelectric conversion device which is described in this embodiment is shown in FIG. 10. The photoelectric conversion device shown in FIG. 10 includes an electrostatic protection circuit 801 and a photoelectric conversion circuit 802. The photoelectric conversion circuit 802 includes a photodiode 803A which is formed by stacking semiconductor layers and an amplifier circuit 803B including a plurality of transistors. In addition, the electrostatic protection circuit 801 includes a first resistor element 804, a plurality of diode elements 805, a second resistor element 806, a first n-channel transistor 807, a third resistor element 808, and a second n-channel transistor 809 which are included in a comparing circuit, a p-channel transistor 810, an n-channel transistor 811, and a capacitor element 812. The connection and operation of each element in the photoelectric conversion device shown in FIG. 10 are the same as in Embodiment 2.

Next, a manufacturing method of the photoelectric conversion device will be described with reference to cross-sectional views as an example. The manufacturing method of the photoelectric conversion device will be described with reference to FIGS. 11A to 11D and FIGS. 12A to 12C.

First, a photodiode and a thin film transistor are formed over a substrate (a first substrate 1110). Here, AN100 which is one of glass substrates is used as the substrate 1110. A thin film transistor is used as a transistor formed over the substrate so that a photo diode and the thin film transistor can be formed over the substrate in the same process; therefore, there is an advantage that the photoelectric conversion device is easy to be produced in large quantities.

Next, a silicon oxide film containing nitrogen (with a film thickness of 100 nm) to be a base insulating film 1112 is formed by a plasma CVD method, and a semiconductor film such as an amorphous silicon film containing hydrogen (with a film thickness of 54 nm) is stacked thereover without being exposed to atmospheric air. Also, the base insulating film 1112 may be a stacked layer of a silicon oxide film, a silicon nitride film and a silicon oxide film containing nitrogen. For example, the base insulating film 1112 may be formed by a film which is formed by stacking a silicon nitride film containing oxygen with a thickness of 50 nm and a silicon oxide film containing nitrogen with a thickness of 100 nm. The silicon oxide film containing nitrogen or the silicon nitride film serves as a blocking layer which prevents an impurity such as an alkali metal from diffusing from a glass substrate.

Then, the amorphous silicon film is crystallized by using a known technique (such as a solid-phase growth method, a laser crystallization method, or a crystallization method using a catalyst element) to form a semiconductor film having a crystal structure (a crystalline semiconductor film), for example, a polycrystalline silicon film. Here, a polycrystalline silicon film is obtained by a crystallization method using a catalyst element. A nickel acetate solution containing nickel of 10 ppm by weight is added by a spinner. It is to be noted that a nickel element may be dispersed over the entire surface by a sputtering method instead of adding the solution. Next, the semiconductor film is crystallized by heat treatment to form a semiconductor film having a crystal structure (here, polycrystalline silicon film). Here, a polycrystalline silicon film is obtained by a heat treatment for crystallization (at 550° C. for 4 hours) after the heat treatment (at 500° C. for one hour).

Next, an oxide film over the surface of the polycrystalline silicon film is removed by a dilute hydrofluoric acid or the like. After that irradiation of laser light (XeCl: wavelength of 308 nm) for raising a degree of crystallization and repairing a defect left in a crystal grain is performed in an atmospheric air or in an oxygen atmosphere.

Excimer laser light of a wavelength of 400 nm or less, or the second harmonic or the third harmonic of a YAG laser is used for the laser light. Here, pulse laser light with a repetition rate of approximately 10 to 1000 Hz is used, the pulse laser light is condensed to 100 to 500 mJ/cm$^2$ by an optical system, and irradiation is performed with an overlap rate of 90 to 95%, whereby a surface of the silicon film may be scanned. In this embodiment, the irradiation of the laser light is performed in an atmospheric air with a repetition rate of 30 Hz and energy density of 470 mJ/cm$^2$.

It is to be noted that an oxide film is formed over the surface by the laser light irradiation since the irradiation is conducted in an atmospheric air or in an oxygen atmosphere. Note that although an example in which the pulsed laser is used is shown in this embodiment, a continuous wave laser may be used instead. In order to obtain crystal with large grain size at the time of crystallization of a semiconductor film, it is preferable to use a solid laser which is capable of continuous oscillation and to apply the second to fourth harmonic of a fundamental wave. As a typical example, the second harmonic (532 nm) or the third harmonic (355 nm) of an Nd:YVO$_4$ laser (fundamental wave of 1064 nm) may be applied.

In the case of using a continuous wave laser, laser light emitted from the continuous wave type YVO$_4$ laser of 10 W output is converted into harmonics by using a non-linear optical element. The harmonic may also be emitted by setting YVO$_4$ crystals and a non-linear optical element in a resonator. It is preferable to shape the laser light into rectangular or elliptical shape on the irradiated surface by an optical system to be irradiated to a processing object. At this time, an energy density of approximately 0.01 to 100 MW/cm$^2$ (preferably, 0.1 to 10 MW/cm$^2$) is necessary. Then, the semiconductor film may be moved at a speed of about 10 to 2000 cm/s relatively to the laser light so as to be irradiated.

Then, in addition to the oxide film formed by the laser light irradiation, a barrier layer made of an oxide film having a thickness of 1 to 5 nm in total is formed by treating the surface with ozone water for 120 seconds. This barrier layer is formed to remove a catalytic element added for crystallization, for example nickel (Ni), from the film. Although the barrier layer is formed by using ozone water here, the barrier layer may be formed by stacking an oxide film having a thickness of approximately 1 to 10 nm by a method of oxidizing a surface of a semiconductor film having a crystal structure by UV-ray irradiation under an oxygen atmosphere; a method of oxidizing a surface of a semiconductor film having a crystal structure by oxygen plasma treatment; a plasma CVD method; a sputtering method; an evaporation method; or the like. In addition, before forming the barrier layer, the oxide film formed by laser light irradiation may be removed.

Then, an amorphous silicon film containing an argon element which serves as a gettering site is formed to be 10 to 400, here 100 nm, in thickness, over the barrier layer by a sputtering method. Here, the amorphous silicon film containing an argon element is formed in an atmosphere containing argon using a silicon target. In the case of using a plasma CVD method, the amorphous silicon film including the argon element is formed under the condition where the flow rate of monosilane to argon ($SiH_4$:Ar) is 1:99, the film-forming pressure is 6.665 Pa, RF power density is 0.087 W/cm$^2$, and the film-forming temperature is 350° C.

After that, a furnace heated to 650° C. is used for heat treatment for three minutes to remove a catalyst element (gettering). Through this treatment, the catalyst element concentration in the semiconductor film having a crystal structure is reduced. It is to be noted that a lamp annealing apparatus may be used instead of the furnace.

Subsequently, the amorphous silicon film containing an argon element, which is a gettering site, is selectively removed with the barrier layer as an etching stopper, and then, the barrier layer is selectively removed by dilute hydrofluoric acid. It is to be noted that since nickel is likely to move to the region where the oxygen concentration is high in the gettering process, the barrier layer formed of the oxide film is preferably removed after the gettering.

If the semiconductor film is not crystallized using a catalyst element, the above-described steps of forming the barrier layer, forming the gettering site, performing the thermal treatment for the gettering, removing the gettering site, removing the barrier layer, and the like are not required.

Next, a thin oxide film is formed on the surface of the semiconductor film having the crystal structure (e.g., a crystalline silicon film) using ozone water, and a resist mask is formed using a first photomask. Then, the semiconductor film having the crystal structure is etched into desired shapes to form a semiconductor film isolated in an island shape (referred to as "island-shaped semiconductor regions 1131" in this specification) (see FIG. 11A). After the island-shaped semiconductor region is formed, the resist mask is removed.

Next, an extremely small amount of impurity element (boron or phosphorus) is added in order to control the threshold value of the TFT if necessary. An ion doping method is performed herein in which diborane ($B_2H_6$) is plasma-excited without mass-separation.

Next, the oxide film is removed with an etchant containing hydrofluoric acid, and at the same time, the surfaces of the island-shaped semiconductor region 1131 are washed. After that, an insulating film containing silicon as its main component, which serves as a gate insulating film 1113, is formed. Here, a silicon oxide film containing nitrogen (composition ratio Si=32%, O=59%, N=7%, H=2%) is formed to 115 nm in thickness by a plasma CVD method.

Figure 11A:
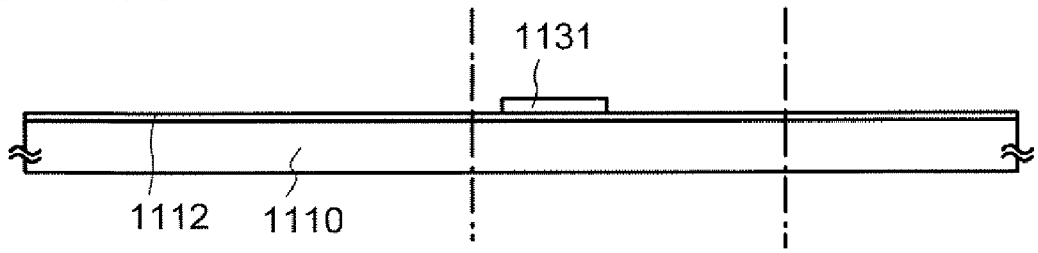
FIGS. 11A to 11D are diagrams for illustrating Embodiment 3.
Figure 11B:
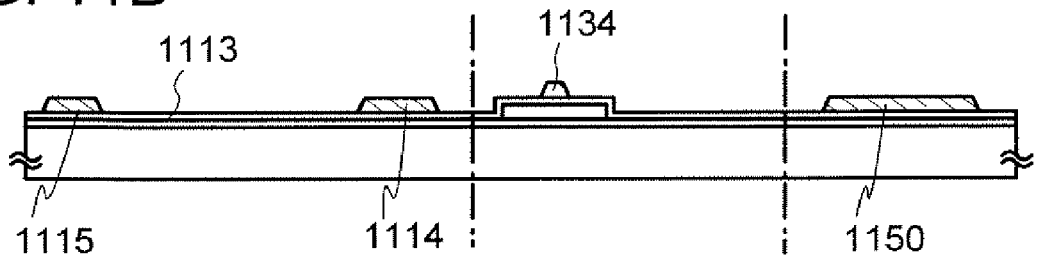

Subsequently, after a metal film is formed over the gate insulating film 1113, a second photomask is used to form gate electrodes 1134, wirings 1114 and 1115, and a terminal electrode 1150 (see FIG. 11B). As the metal film, for example, a film is used, in which tantalum nitride and tungsten (W) are stacked to 30 nm and 370 nm, respectively, in thickness.

In addition, as well as the above-described material, a single-layer film formed from an element selected from titanium (Ti), tungsten (W), tantalum (Ta), molybdenum (Mo), neodymium (Nd), cobalt (Co), zirconium (Zr), zinc (Zn), ruthenium (Ru), rhodium (Rh), palladium (Pd), osmium (Os), iridium (Ir), platinum (Pt), aluminum (Al), gold (Au), silver (Ag), or copper (Cu), or an alloy material or a compound material containing the element as its main component; or a single-layer film formed from nitride thereof, such as titanium nitride, tungsten nitride, tantalum nitride, or molybdenum nitride can be used as the gate electrode 1134, the wirings 1114 and 1115, and the terminal electrode 1150.

Figure 11C:
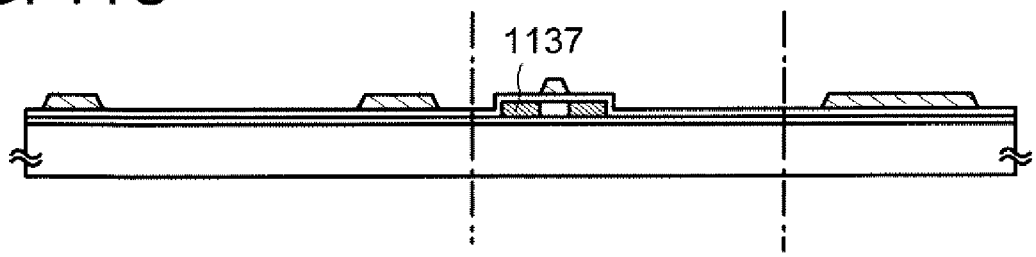

Subsequently, an impurity imparting one conductivity type is introduced to the island-shaped semiconductor region 1131 to form source and drain regions 1137 of a TFT 1193 (see FIG. 11C). An n-channel TFT is formed in this embodiment; therefore, an n-type impurity, for example, phosphorus (P) or arsenic (As) is introduced to the island-shaped semiconductor region 1131. In the case where a p-channel TFT is formed, a p-type impurity is introduced to the island-shaped semiconductor region 1131.

Subsequently, after a first interlayer insulating film containing silicon oxide film (not shown) is formed to 50 nm in thickness by a CVD method, a step for activation treatment of an impurity element added to each island-shaped semiconductor region is conducted. The activation step is conducted by rapid thermal annealing (RTA method) using a lamp light source, a method of irradiation of a YAG laser or an excimer laser from the back side, a heat treatment using a furnace, or a method which is a combination of the foregoing methods.

Then, a second interlayer insulating film 1116 including a silicon nitride film which contains hydrogen and oxygen is formed, for example, to 10 nm in thickness.

Figure 11D:
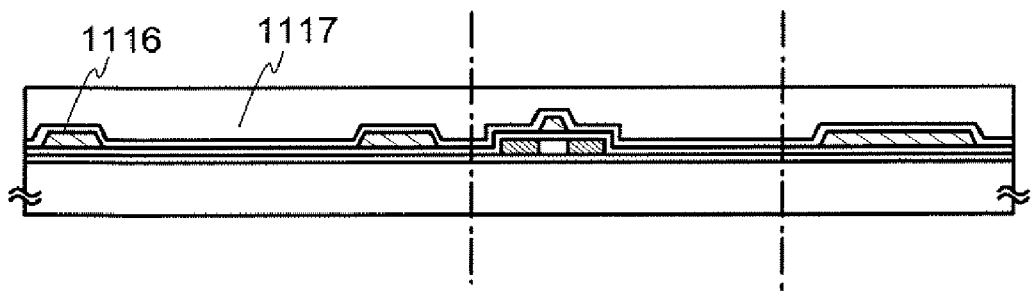

Subsequently, a third interlayer insulating film 1117 formed of an insulating material is formed over the second interlayer insulating film 1116 (see FIG. 11D). An insulating film obtained by a CVD method can be used for the third interlayer insulating film 1117. In this embodiment, in order to improve adhesion, a silicon oxide film containing nitrogen is formed to 900 nm in thickness as the third interlayer insulating film 1117.

Then, heat treatment (heat treatment at 300 to 550° C. for 1 to 12 hours, for example, at 410° C. for 1 hour) is performed to hydrogenate the island-shaped semiconductor film. This process is performed to terminate a dangling bond of the island-shaped semiconductor film by hydrogen contained in the second interlayer insulating film 1116. The island-shaped semiconductor film can be hydrogenated regardless of whether or not the gate insulating film 1113 is formed.

In addition, as the third interlayer insulating film 1117, an insulating film using siloxane and a layered structure thereof can also be used. Siloxane has a skeletal structure with the bond of silicon (Si) and oxygen (O). As a substituent, a compound containing at least hydrogen (such as an alkyl group or an aromatic hydrocarbon) is used. Fluorine may also be used as a substituent. Moreover, a compound containing at least hydrogen and fluorine may be used as a substituent.

When an insulating film using siloxane and a layered structure thereof are used as the third interlayer insulating film 1117, after forming the second interlayer insulating film 1116, a heat treatment for hydrogenating the island-shaped semiconductor film may be conducted, and then, the third interlayer insulating film 1117 may be formed.

Next, a resist mask is formed using a third photomask, and the first interlayer insulating film, the second interlayer insulating film 1116, and the third interlayer insulating film 1117, or the gate insulating film 1113 are selectively etched to form contact holes. The resist mask is then removed.

It is to be noted that the third interlayer insulating film 1117 may be formed if necessary. When the third interlayer insulating film 1117 is not formed, after forming the second interlayer insulating film 1116, the first interlayer insulating film, the second interlayer insulating film 1116, and the gate insulating film 1113 are selectively etched to form contact holes.

Next, after forming a metal stacked film by a sputtering method, a resist mask is formed by using a fourth photomask, and then, the metal film is selectively etched to form a wiring 1119, a connection electrode 1120, a terminal electrode 1151, a source or drain electrode 1141 of the TFT 1193. Then, the resist mask is removed. Note that the metal film of this embodiment is a stacked layer of three films: a Ti film with a thickness of 100 nm, an Al film containing a very small amount of Si with a thickness of 350 nm, and a Ti film with a thickness of 100 nm.

In addition, in a case where each of the wiring 1119, the connection electrode 1120, the terminal electrode 1151, the source or drain electrode 1141 of the TFT 1193 is formed of a single-layer conductive film, a titanium film (Ti film) is preferable in terms of heat resistance, conductivity, and the like. Instead of a titanium film, a single-layer film formed from an element selected from tungsten (W), tantalum (Ta), molybdenum (Mo), neodymium (Nd), cobalt (Co), zirconium (Zr), zinc (Zn), ruthenium (Ru), rhodium (Rh), palladium (Pd), osmium (Os), iridium (Ir) and platinum (Pt), or an alloy material or a compound material containing the above element as its main component; a single-layer film formed from nitride thereof, for example, titanium nitride, tungsten nitride, tantalum nitride, or molybdenum nitride may be used. The number of times of deposition can be reduced in the manufacturing process, by formation of each of the wiring 1119, the connection electrode 1120, the terminal electrode 1151, and the source or drain electrode 1141 of the TFT 1193 as a single-layer film.

The top gate TFTs 1193 using a polycrystalline silicon film can be manufactured by the process described above.

Figure 12A:
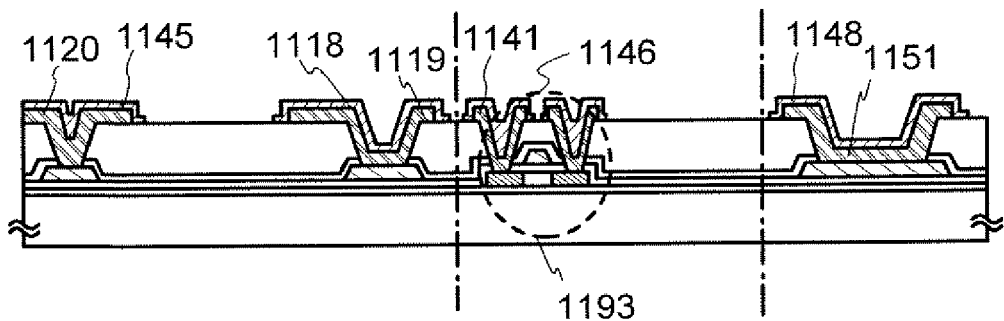
FIGS. 12A to 12C are diagrams for illustrating Embodiment 3.

Subsequently, after formation of a conductive metal film (such as titanium (Ti) or molybdenum (Mo)) which is not likely to be an alloy by reacting with a photoelectric conversion element (typically, amorphous silicon) which is formed later, a resist mask is formed using a fifth photomask, and then, the conductive metal film is selectively etched to form protective electrodes 1118, 1145, 1146, and 1148 which cover the wiring 1119 (see FIG. 12A). Here, a Ti film with a thickness of 200 nm obtained by a sputtering method is formed. It is to be noted that the connection electrode 1120, the terminal electrode 1151, the source or drain electrode 1141 of the TFT 1193 are covered with the conductive metal film as well. Thus, the conductive metal film can also cover the side faces of each electrode at which the Al film of the second layer is exposed, whereby the conductive metal film can also prevent diffusion of aluminum atoms to the photoelectric conversion element.

Note that in a case where each of the wiring 1119, the connection electrode 1120, the terminal electrode 1151, and the source or the drain electrode 1141 of the TFT 1193 are formed as a single-layer conductive film, the protective electrode 1118, 1145, 1146, and 1148 are not necessarily formed.

Next, a photoelectric conversion element 1111 including a p-type to semiconductor layer 1111p, an i-type semiconductor layer 1111i, and an n-type semiconductor layer 1111n is formed over the third interlayer insulating film 1117.

The p-type semiconductor layer 1111p may be formed by deposition of a semi-amorphous silicon film containing an impurity element belonging to Group 13 of the periodic table, such as boron (B), by a plasma CVD method.

In addition, the wiring 1119 and the protective electrode 1118 are in contact with the bottom layer of the photoelectric conversion element 1111, in this embodiment, the p-type semiconductor layer 1111p.

After the p-type semiconductor layer 1111p is formed, further, the i-type semiconductor layer 1111i and the n-type semiconductor layer 1111n are sequentially formed. Accordingly, the photoelectric conversion element 1111 including the p-type semiconductor layer 1111p, the i-type semiconductor layer 1111i, and the n-type semiconductor layer 1111n is formed.

As the i-type semiconductor layer 1111i, for example, a semi-amorphous silicon film may be formed by a plasma CVD method. Note that as the n-type semiconductor layer 1111n, a semi-amorphous silicon film containing an impurity element belonging to Group 15 of the periodic table, such as phosphorus (P), may be formed, or after formation of a semi-amorphous silicon film, an impurity element belonging to Group 15 of the periodic table may be introduced.

In addition, as the p-type semiconductor layer 1111p, the i-type semiconductor layer 1111i, and the n-type semiconductor layer 1111n, not only the semi-amorphous semiconductor film but also an amorphous semiconductor film may be used.

Figure 12B:
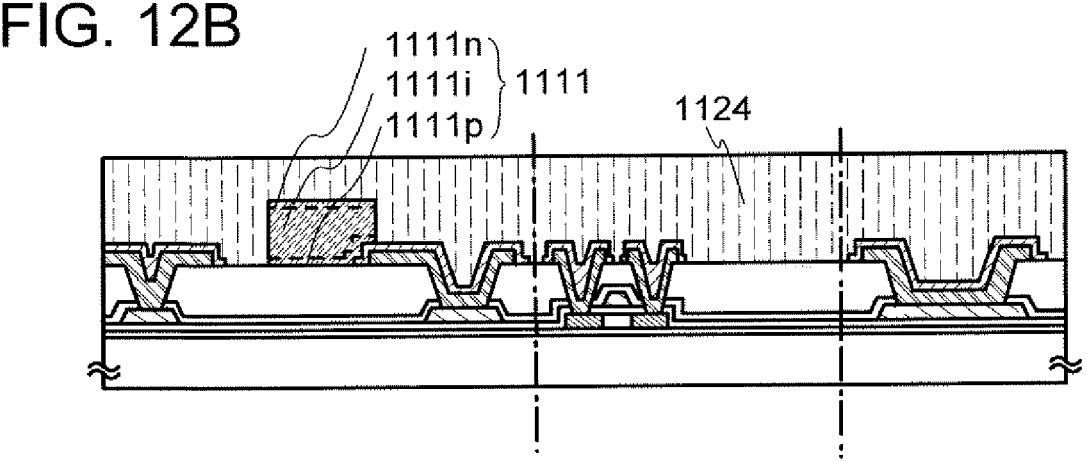

Next, a sealing layer 1124 is formed from an insulating material (for example, an inorganic insulating film containing silicon) to have a thickness of 1 to 30 μm over the entire surface to obtain a state shown in FIG. 12B. Here, as an insulating material film, a silicon oxide film containing nitrogen is formed to 1 μm in thickness by a CVD method. It is intended that adhesiveness be improved by using the insulating film formed by a CVD method.

Subsequently, after the sealing layer 1124 is etched to provide an opening portion, terminal electrodes 1121 and 1122 are formed by a sputtering method. The terminal electrode 1121 and the terminal electrode 1122 are formed of a stacked-layer film of a titanium film (Ti film, 100 nm), a nickel film (Ni film, 300 nm), and a gold film (Au film, 50 nm). The fixing strength of the terminal electrodes 1121 and 1122 exceeds 5 N, which is an enough fixing strength for a terminal electrode.

Figure 12C:
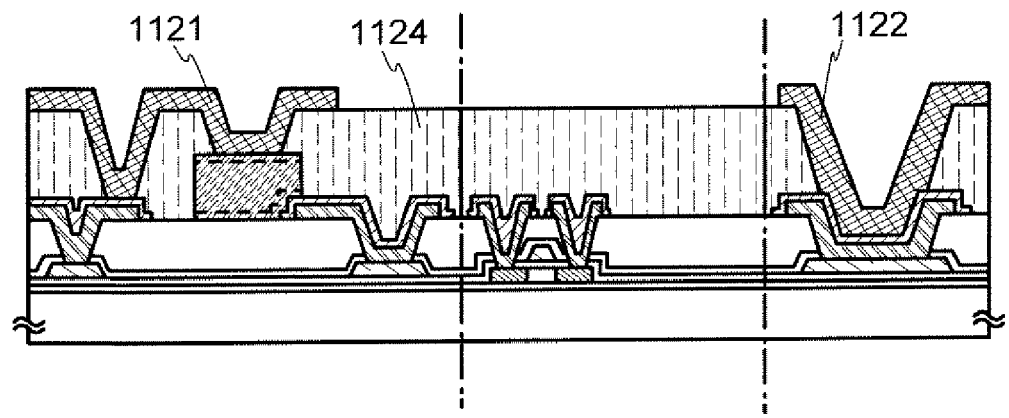

Through the process described above, the terminal electrodes 1121 and 1122 which can be connected by a solder are formed, and a structure shown in FIG. 12C can be obtained.

Note that a substrate may be cut into individual pieces to obtain a plurality of photoelectric conversion devices, so that the photoelectric conversion device obtained through the above-described process can be mass-produced. A large number of photoelectric conversion devices (e.g., 2 mm×1.5 mm) can be manufactured from one large substrate (e.g., 600 cm×720 cm).

Note that as a manufacturing method of the island-shaped semiconductor region 1131 shown in this embodiment, the island-shaped semiconductor region 1131 can be manufactured by another manufacturing method without being limited to the above-mentioned manufacturing method. For example, the island-shaped semiconductor region 1131 can be formed by using an SOI (silicon on insulator) substrate. It is acceptable as long as a known SOI substrate is used as the SOI substrate, and a manufacturing method and a structure thereof are not particularly limited to certain types. As the SOI substrate, a SIMOX substrate and a bonded substrate can be typically given. In addition, examples of the bonded substrate are ELTRAN (registered trademark), UNIBOND (registered trademark), Smart Cut (registered trademark), and the like.

In the case of the SIMOX substrate, an oxygen ion is implanted into a single crystal silicon substrate, and heat treatment at 1300° C. or more is performed to form a buried oxide (BOX) film layer; thus, a thin-film silicon layer is formed on the surface of the single crystal silicon substrate, and an SOI structure can be obtained. The thin film silicon layer is insulated from the single crystal silicon substrate by the buried oxide film layer. Further, a technique referred to as ITOX (internal thermal oxidation-SIMOX) in which thermal oxidation is further performed after a buried oxide film layer is formed can also be used.

A bonded substrate is an SOI substrate which is obtained in such a manner that two single crystal silicon substrates (a first single crystal silicon substrate and a second single crystal silicon substrate) are bonded with an oxide film layer interposed therebetween and one of the single crystal silicon substrates is thinned from a surface on the side which is opposite to the bonded side, so that a thin film silicon layer is formed on the surface. The oxide film layer can be formed by thermal oxidation of one of the substrates (here the first single crystal silicon substrate). Further, the two single crystal silicon substrates can be bonded directly without using an adhesive.

Note that the bonded substrate may be formed in such a manner that a substrate having an insulating surface, such as a glass substrate and a single crystal substrate are bonded to each other to form an SOI substrate, without being limited to bonding two single crystal substrates.

Note that in this embodiment, the contents described in each drawing can be freely combined or replaced with the contents described in any of different embodiments as appropriate.

Embodiment 4

In this embodiment, examples of incorporating a photoelectric conversion device including an electrostatic protection circuit into a variety of electronic devices will be described. As electronic devices including electrostatic protection circuits or photoelectric conversion devices having the electrostatic protection circuits, computers, displays, mobile phones, television sets, and the like can be given. Specific examples of such electronic devices are shown in FIG. 13, FIGS. 14A and 14B, FIGS. 15A and 15B, FIG. 16, and FIGS. 17A and 17B.

Figure 13:
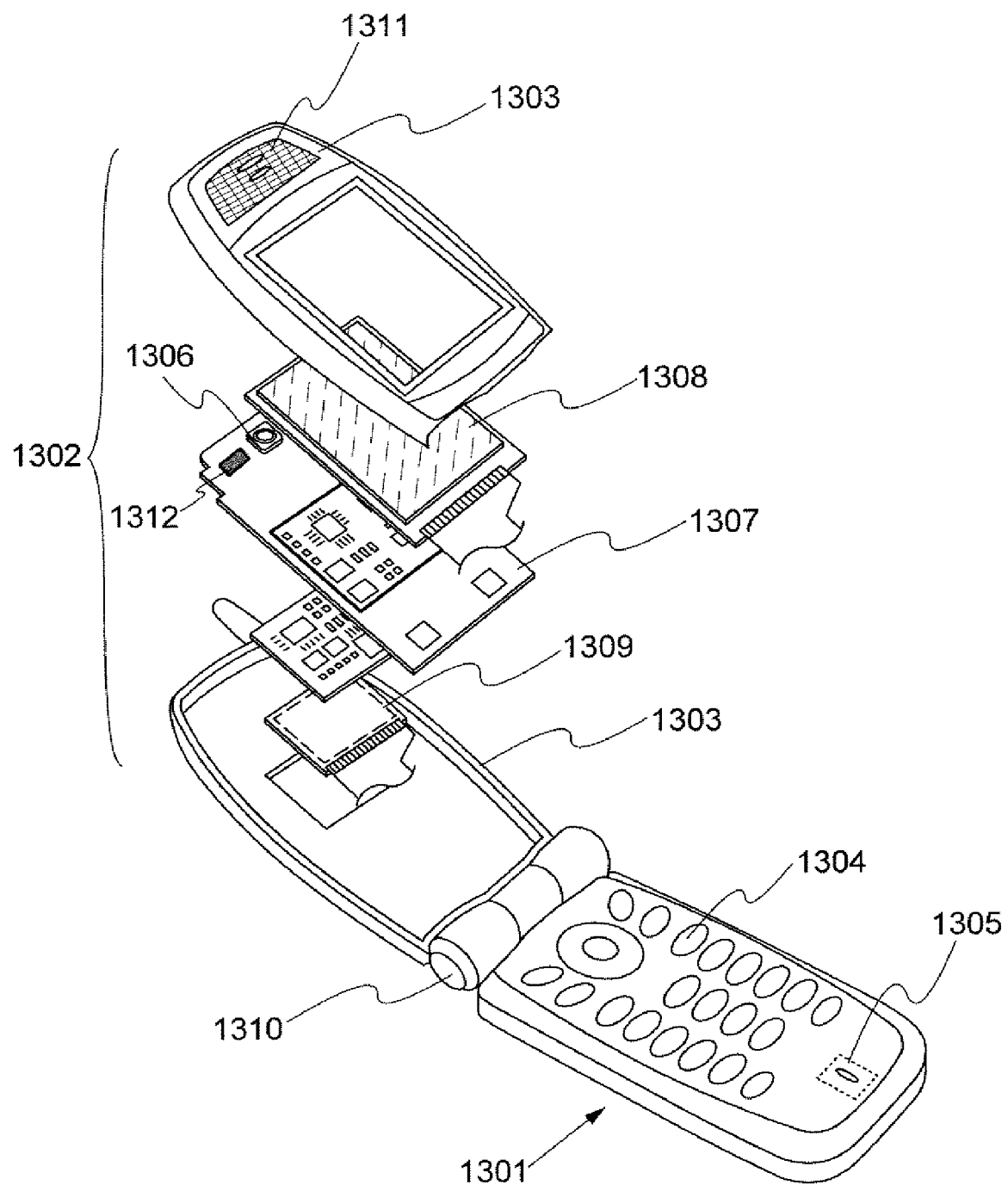
FIG. 13 is a diagram for illustrating Embodiment 4.

FIG. 13 shows a mobile phone and includes a main body (A) 1301, a main body (B) 1302, a housing 1303, operation keys 1304, an audio input portion 1305, an audio output portion 1306, a circuit board 1307, a display panel (A) 1308, a display panel (B) 1309, a hinge 1310, a light-transmitting material portion 1311, and a photoelectric conversion device 1312. An electrostatic protection circuit can be applied to the photoelectric conversion device 1312.

The photoelectric conversion device 1312 detects light which is transmitted through the light-transmitting material portion 1311, and the luminance of the display panel (A) 1308, the display panel (B) 1309 is controlled based on the illuminance of external light that is detected, or illumination of the operation keys 1304 is controlled based on the illuminance obtained by the photoelectric conversion device 1312. In this manner, current consumption of the mobile phone can be suppressed.

Figure 14A:
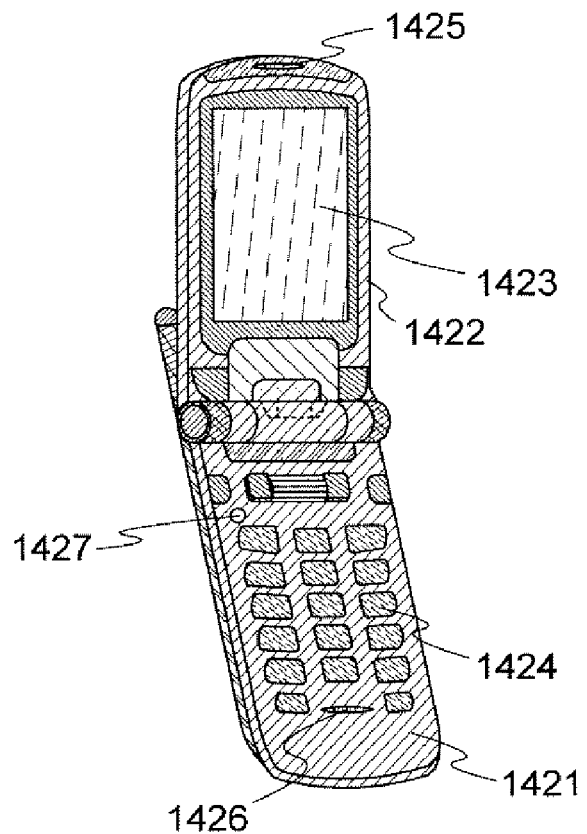
FIGS. 14A and 14B are diagrams for illustrating Embodiment 4.
Figure 14B:
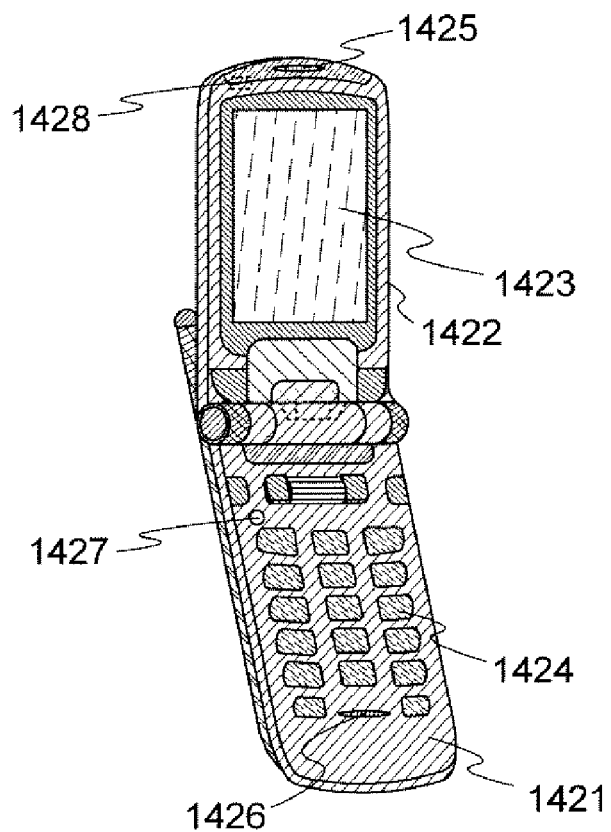

FIGS. 14A and 14B show other examples of a mobile phone. In FIGS. 14A and 14B, reference numeral 1421 denotes a main body, 1422 denotes a housing, 1423 denotes a display panel, 1424 denotes operation keys, 1425 denotes an audio output portion, 1426 denotes an audio input portion, 1427 denotes a photoelectric conversion device, and 1428 denotes a photoelectric conversion device.

In the mobile phone shown in FIG. 14A, the luminance of the display panel 1423 and the operation keys 1424 can be controlled through the detection of external light by the photoelectric conversion device 1427 provided in the main body 1421.

In the mobile phone shown in FIG. 14B, the photoelectric conversion device 1428 is provided inside the main body 1421 in addition to the structure of FIG. 14A. With the photoelectric conversion device 1428, the luminance of a backlight provided in the display panel 1423 can be detected.

Figure 15A:
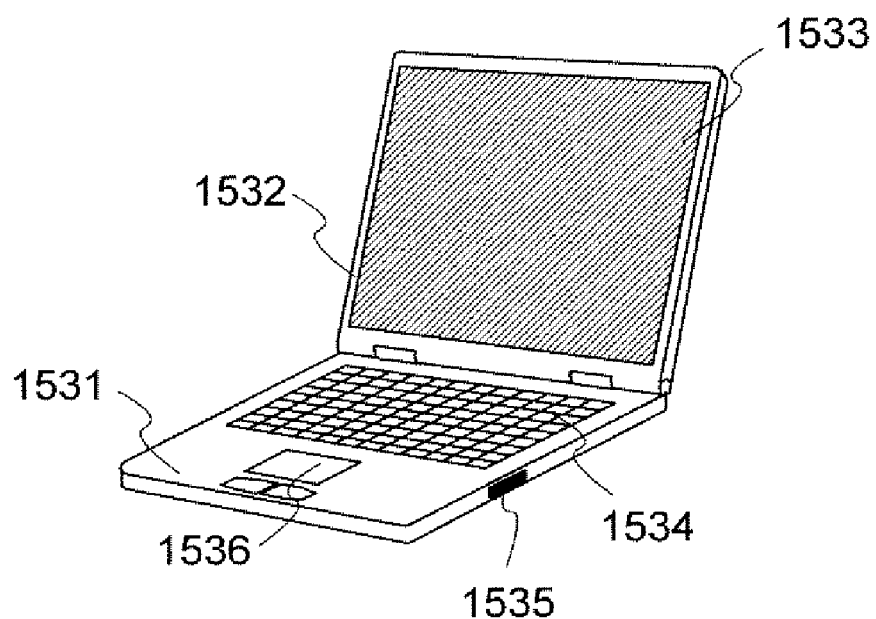
FIGS. 15A and 15B are diagrams for illustrating Embodiment 4.

FIG. 15A shows a computer, which includes a main body 1531, a housing 1532, a display portion 1533, a keyboard 1534, an external connecting port 1535, a pointing device 1536, and the like.

Figure 15B:
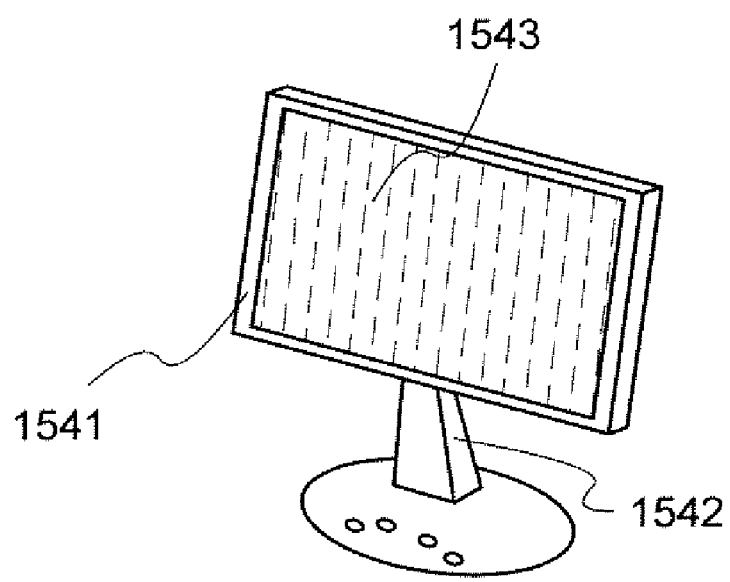

In addition, FIG. 15B shows a display device such as a television receiver. The display device includes a housing 1541, a supporting base 1542, a display portion 1543, and the like.

Figure 16:
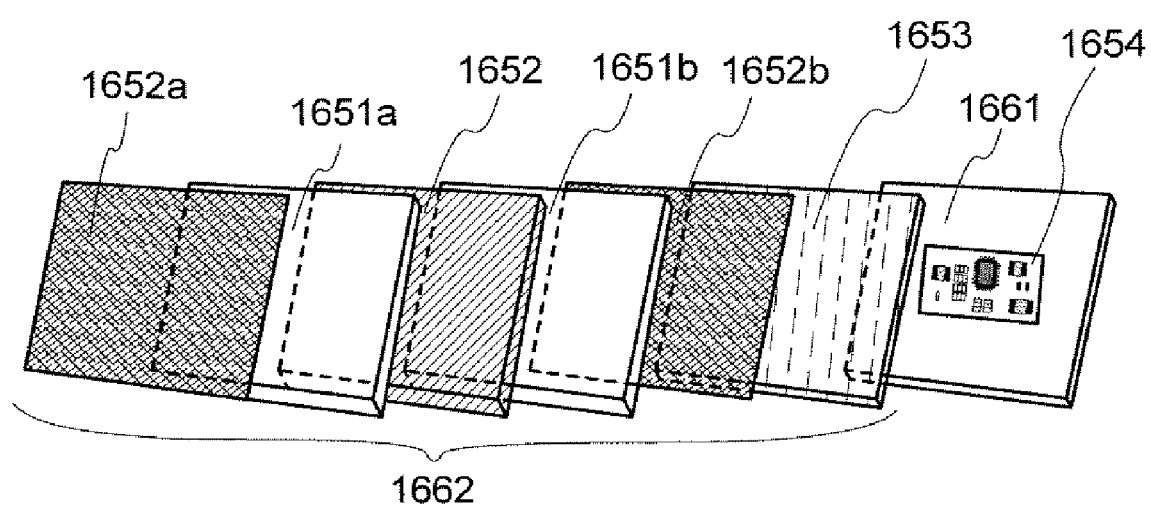
FIG. 16 is a diagram for illustrating Embodiment 4.

FIG. 16 shows a detailed structure of the case where a liquid crystal panel is used for the display portion 1543 provided in the computer of FIG. 15A and the display portion 1533 of the display device shown in FIG. 15B.

A liquid crystal panel 1662 shown in FIG. 16 is incorporated in a housing 1661 and includes substrates 1651a and 1651b, a liquid crystal layer 1652 interposed between the substrates 1651a and 1651b, polarizing filters 1652a and 1652b, a backlight 1653, and the like. A photoelectric conversion device 1654 is formed in the housing 1661.

The photoelectric conversion device 1654 manufactured detects the amount of light from the backlight 1653, and the luminance of the liquid crystal panel 1662 is adjusted by feedback of information related to the amount of light detection.

Figure 17A:
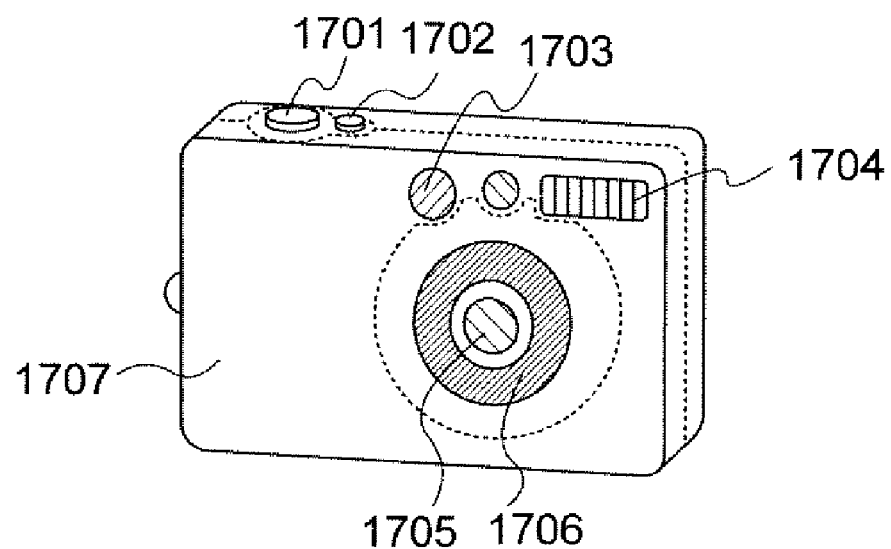
FIGS. 17A and 17B are diagrams for illustrating Embodiment 4.
Figure 17B:
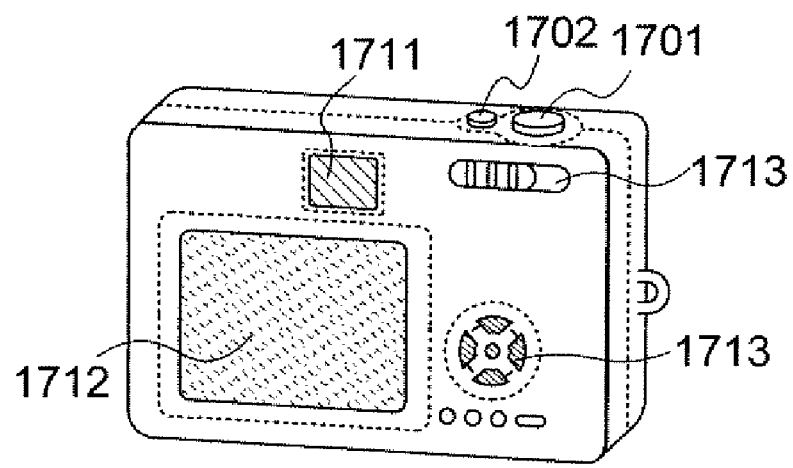

FIGS. 17A and 17B show an example in which the photoelectric conversion device including an electrostatic protection circuit is incorporated in a camera such as a digital camera. FIG. 17A is a perspective view seen from a front side direction of the digital camera. FIG. 17B is a perspective view seen from a backside direction. In FIG. 17A, the digital camera includes a release button 1701, a main switch 1702, a finder window 1703, a flash portion 1704, a lens 1705, a lens barrel 1706, and a housing 1707.

In addition, in FIG. 17B, a finder eyepiece window 1711, a monitor 1712, and operation buttons 1713 are included.

When the release button 1701 is pushed down to the half point, a focus adjustment mechanism and an exposure adjustment mechanism are activated. When the release button is pushed down to the lowest point, a shutter opens.

By pushing down or rotating the main switch 1702, power of the digital camera is switched on or off.

The finder window 1703 is provided above the lens 1705 of the front side of the digital camera, and is a device for confirming an area which is photographed or a focus position from the finder eyepiece window 1711 shown in FIG. 17B.

The flash portion 1704 is placed at the upper portion of the anterior surface of the digital camera, and when object luminance is low, supporting light is emitted concurrently with the opening of the shutter by being held down.

The lens 1705 is located at the front side of the digital camera and made of a focusing lens, a zoom lens, and the like. The lens forms a photographic optical system with a shutter and a diaphragm which are not illustrated. In addition, behind the lens, an image sensor such as a CCD (charge coupled device) is provided.

The lens barrel 1706 moves a lens position to adjust the focus of the focusing lens, the zoom lens and the like. In shooting, the barrel is slid out to move the lens 1705 forward. In addition, when carrying it, the lens 1705 is moved backward to be compact. Note that a structure is employed in this embodiment, in which the lens barrel is slid out so that the object can be shot by being zoomed; however, the structure of the digital camera is not limited thereto. Instead, a digital camera may employ a structure in which zoom shooting can be conducted without sliding out the lens barrel by a photographing optical system inside the housing 1707.

The finder eyepiece window 1711 is located in the upper portion of the backside of the digital camera for looking therethrough in checking the shooting range and the focus point.

The operation button 1713 is a button for various functions provided on the backside of the digital camera, which includes a set up button, a menu button, a display button, a functional button, a selecting button, and the like.

When the photoelectric conversion device is incorporated into the camera shown in FIGS. 17A and 17B, the photoelectric conversion device can detect whether light exists or not and light intensity, so that exposure or the like of the camera can be adjusted. The photoelectric conversion device including an electrostatic protection circuit can function as a photoelectric conversion device without adversely affecting actual operation. Therefore, a camera including a photoelectric conversion device which has high reliability on a malfunction and has high yield can be obtained.

In addition, a photoelectric conversion device including an electrostatic protection circuit can also be applied to other electronic devices such as a projection TV and a navigation system. In other words, it can be applied to any electronic device as long as it needs to detect light.

Note that in this embodiment, the contents described in each drawing can be freely combined or replaced with the contents described in any of different embodiments as appropriate.

This application is based on Japanese Patent Application serial no. 2008-065273 filed with Japan Patent Office on Mar. 14, 2008, the entire contents of which are hereby incorporated by reference.

What is claimed is:

1. A photoelectric conversion device comprising:
   a first wiring;
   a second wiring;
   a first switch;
   a second switch;
   a capacitor;
   a comparing circuit configured to generate a signal corresponding to a potential of the first wiring and a potential of the second wiring, and supply the signal to the first switch and the second switch; and
   a photoelectric conversion element,
   wherein:
   the first wiring is electrically connected to a first terminal of the first switch and a first terminal of the photoelectric conversion element,
   the second wiring is electrically connected to a first terminal of the second switch and a second terminal of the photoelectric conversion element,
   a second terminal of the first switch is electrically connected to a first electrode of the capacitor, and
   a second terminal of the second switch is electrically connected to a second electrode of the capacitor.

2. A photoelectric conversion device according to claim 1, wherein the first switch is a p-channel transistor, and wherein the second switch is an n-channel transistor.

3. A photoelectric conversion device according to claim 1, wherein the first wiring, the second wiring, the first switch, the second switch, the capacitor, and the comparing circuit are provided over a light-transmitting substrate.

4. A photoelectric conversion device according to claim 1, wherein the photoelectric conversion element includes a p-type semiconductor layer, an i-type semiconductor layer, and an n-type semiconductor layer.

5. A photoelectric conversion device according to claim 1, further comprising a first resistor and a second resistor,
   wherein the first resistor is disposed between the first wiring and the first terminal of the first switch, and
   wherein the second resistor is disposed between the second wiring and the first terminal of the second switch.

6. A photoelectric conversion device according to claim 1, further comprising an amplifier circuit disposed between the second wiring and the second terminal of the photoelectric conversion element.

7. A photoelectric conversion device according to claim 1, further comprising an amplifier circuit disposed between the second wiring and the second terminal of the photoelectric conversion element, wherein the amplifier circuit includes a thin film transistor.

8. A photoelectric conversion device comprising:
   a first wiring;
   a second wiring;
   a first switch;
   a second switch;
   a capacitor;
   a comparing circuit configured to generate a signal corresponding to a potential of the first wiring and a potential of the second wiring, and supply the signal to the first switch and the second switch; and
   a photoelectric conversion element,
   wherein:
   the first wiring is electrically connected to a first terminal of the first switch and a first terminal of the photoelectric conversion element,
   the second wiring is electrically connected to a first terminal of the second switch and a second terminal of the photoelectric conversion element,
   a second terminal of the first switch is electrically connected to a first electrode of the capacitor,
   a second terminal of the second switch is electrically connected to a second electrode of the capacitor,
   the first switch and the second switch are turned off by the signal supplied from the comparing circuit when the potential of the first wiring is a high power supply potential, and
   the first switch and the second switch are turned on by the signal supplied from the comparing circuit when the potential of the first wiring is higher than the high power supply potential.

9. A photoelectric conversion device according to claim 8, wherein the first switch is a p-channel transistor, and wherein the second switch is an n-channel transistor.

10. A photoelectric conversion device according to claim 8, wherein the first wiring, the second wiring, the first switch, the second switch, the capacitor, and the comparing circuit are provided over a light-transmitting substrate.

11. A photoelectric conversion device according to claim 8, wherein the photoelectric conversion element includes a p-type semiconductor layer, an i-type semiconductor layer, and an n-type semiconductor layer.

12. A photoelectric conversion device according to claim 8, further comprising a first resistor and a second resistor,
    wherein the first resistor is disposed between the first wiring and the first terminal of the first switch, and
    wherein the second resistor is disposed between the second wiring and the first terminal of the second switch.

13. A photoelectric conversion device according to claim 8, further comprising an amplifier circuit disposed between the second wiring and the second terminal of the photoelectric conversion element.

14. A photoelectric conversion device according to claim 8, further comprising an amplifier circuit disposed between the second wiring and the second terminal of the photoelectric conversion element, wherein the amplifier circuit includes a thin film transistor.

\* \* \* \* \*

UNITED STATES PATENT AND TRADEMARK OFFICE
CERTIFICATE OF CORRECTION

PATENT NO. : 8,115,160 B2  
APPLICATION NO. : 12/398465  
DATED : February 14, 2012  
INVENTOR(S) : Jun Koyama et al.

It is certified that error appears in the above-identified patent and that said Letters Patent is hereby corrected as shown below:

Column 4, line 22, "an electrostatic protect tion circuit" should read "an electrostatic protection circuit"

Column 8, line 39, "the second switch 10" should read "the second switch 105"

Column 10, line 6, "Ath stage" should read "Nth stage"

Column 15, line 61, "p-type to semiconductor layer" should read "p-type semiconductor layer"

Signed and Sealed this  
Eighteenth Day of September, 2012

David J. Kappos  
*Director of the United States Patent and Trademark Office*